United States Patent
Khsiba et al.

(10) Patent No.: US 10,284,276 B2
(45) Date of Patent: May 7, 2019

(54) WEIGHTED SEQUENTIAL DECODING

(71) Applicant: INSTITUT MINES-TELECOM, Paris (FR)

(72) Inventors: Mohamed-Achraf Khsiba, Paris (FR); Ghaya Rekaya Ben-Othman, Paris (FR); Asma Mejri, Antibes (FR)

(73) Assignee: INSTITUT MINES-TELECOM, Paris (FR)

( * ) Notice: Subject to any disclaimer, the term of this patent is extended or adjusted under 35 U.S.C. 154(b) by 0 days.

(21) Appl. No.: 15/390,057

(22) Filed: Dec. 23, 2016

(65) Prior Publication Data
US 2017/0187445 A1 Jun. 29, 2017

(30) Foreign Application Priority Data
Dec. 28, 2015 (EP) .................................... 15307155

(51) Int. Cl.
*H04B 7/08* (2006.01)
*H04B 7/0413* (2017.01)
(Continued)

(52) U.S. Cl.
CPC ............ *H04B 7/08* (2013.01); *H04B 7/0413* (2013.01); *H04L 25/03242* (2013.01); *H04L 1/0631* (2013.01)

(58) Field of Classification Search
CPC combination set(s) only.
See application file for complete search history.

(56) References Cited

U.S. PATENT DOCUMENTS

| 8,442,105 B1 * | 5/2013 | Dick | H04L 1/0048 375/229 |
| 2010/0042666 A1 * | 2/2010 | Park | H04B 7/0413 708/212 |

(Continued)

FOREIGN PATENT DOCUMENTS

| EP | 3001625 A1 | 3/2016 |
| EP | 3104564 A1 | 12/2016 |
| EP | 3104565 A1 | 12/2016 |

OTHER PUBLICATIONS

Salah et al., New Soft Stack Decoder for MIMO Channel, 2008, IEEE, pp. 1754-1758.*

(Continued)

*Primary Examiner* — Wednel Cadeau
(74) *Attorney, Agent, or Firm* — Meagher Emanuel Laks Goldberg & Liao, LLP

(57) ABSTRACT

Embodiments of the invention provide a decoder (10) for decoding a signal received through a transmission channel in a communication system, the signal carrying information symbols selected from a given set of values and being associated with a signal vector, the transmission channel being represented by a channel matrix. The decoder comprises:
- a sub-block division unit (12) configured to divide the received signal vector into a set of sub-vectors in correspondence with a division of a matrix related to said channel matrix;
- at least one weighting coefficient calculation unit (14) configured to calculate a sub-block weighting coefficient for each sub-vector,
- at least one symbol estimation unit (11) for recursively determining estimated symbols representative of the transmitted symbols carried by the data signal from information stored in a stack.

(Continued)

The at least one symbol estimation unit is configured to apply at least one iteration of a sequential decoding algorithm, the sequential decoding algorithm comprising iteratively filling a stack by expanding child nodes of a selected node of a decoding tree comprising a plurality of nodes, each node of the decoding tree corresponding to a candidate component of a symbol of at least a part of the received signal and each node being assigned an initial metric. The symbol estimation unit is further configured to calculate a modified metric for at least one node of the expanded child nodes from the metric associated with the at least one node and from the sub-block weighting coefficient calculated for the sub-vector to which the at least one node belongs, symbol estimation unit being configured to assign the modified metric to the at least one node.

20 Claims, 10 Drawing Sheets

(51) Int. Cl.
*H04L 25/03* (2006.01)
*H04L 1/06* (2006.01)

(56) References Cited

U.S. PATENT DOCUMENTS

| | | |
|---|---|---|
| 2010/0150274 A1 | 6/2010 | Dai et al. |
| 2011/0122004 A1 | 5/2011 | Rekaya Ben-Othman et al. |
| 2011/0182336 A1 | 7/2011 | Chin et al. |

OTHER PUBLICATIONS

Salah et al., New Soft Stack Decoder for MIMO Channel, 2008, hereinafter "Salah") (Year: 2008).*

C.P. Schnorr and M. Euchner: "Lattice basis reduction: Improved practical algorithms and solving subset sum problems." In Math. Programming, pp. 181-191, 1993.

Belfiore et al.: "The Golden Code: A 2×2 Full-Rate Space-Time Code with Non-Vanishing Determinants", IEEE Transactions on Information Theory, vol. 51, No. 4, pp. 1436-1436, Apr. 2005.

Abediseid et al.: "Lattice Sequential Decoder for Coded MIMO Channel: Performance and Complexity Analysis", CoRR abs/1101.0339, 2011.

European Search Report for 15307155.0 dated Jun. 30, 2016.

Rym Ouertani et al., "A Stack algorithm with limited tree-search", Signals, Circuits and Systems (SCS), 2009 3rd International Conference on, IEEE, Piscataway, NJ, USA, Nov. 6, 2009 (Nov. 6, 2009), pp. 1-6.

Salah et al., "New Soft Stack Decoder for MIMO Channel", Signals, Systems and Computers, 2008 42nd Asilomar Conference on, IEEE, Piscataway, NJ, USA, Oct. 26, 2008 (Oct. 26, 2008), pp. 1754-1758.

Viterbo et al., "A Universal Lattice Code Decoder for Fading Channels", IEEE Transactions on Information Theory, vol. 45, No. 5, pp. 1639-1642, Jul. 1999.

Murugan et al., "A Unified Framework for Tree Search Decoding: Rediscovering the Sequential Decoder", IEEE Transactions on Information Theory, vol. 52, No. 3, pp. 933-953, Mar. 2006.

F. Jelinek, "Fast Sequential Decoding Algorithm Using a Stack", IBM J. Res. Dev., vol. 13, No. 6, pp. 675-685, Nov. 1969.

G.R. Ben-Othamn, "The spherical bound stack decoder", IEEE International Conference on Wireless & Mobile Computing, Networking & Communication, pp. 322-327, Oct. 2008.

Fano, "A Heuristic Discussion of Probabilistic Decoding", IEEE Transactions on Information Theory, vol. 9, No. 2, pp. 64-74, Apr. 1963.

Shalvi et al., "Signal Codes: Convolutional Lattice Codes", IEEE Transactions on Information Theory, vol. 57, No. 8, pp. 5203-5226, Aug. 2011.

\* cited by examiner

WEIGHTED SEQUENTIAL DECODING

BACKGROUND

The invention generally relates to digital communication and in particular to methods, systems, and computer program products for sequentially decoding a received data signal.

While demands in terms of services and applications have known a dramatic growth over the past decades, major advances have been achieved to adapt communication systems to such demands. Modern communication systems include wireless communication systems which provide users access to one or more resources (e.g., bandwidth, transmit power, etc.). Different wireless communication systems are available today, such as the cellular and wireless ad-hoc networks accommodating single or multiple transmitters/receivers using single or multiple antennas, such as MIMO (Multiple Input-Multiple Output) systems. MIMO communication systems increase data transmission rates by exploiting space and time dimensions for communicating data over a multiplicity of antennas and during a multiplicity of time slots.

A major challenge of wireless communication systems is the decoding of the received signals. Indeed, in a wireless communication system, the signals transmitted to one or more receivers are conveyed in a transmission channel affected by fading, interference and noise. The signals received by a receiver can thus be disturbed. A decoder is thus required to decode the original desired signal correctly.

A decoder estimates the original data conveyed by one or multiple transmitters from the received signal by comparing the received vector of information symbols with possible vectors of transmitted symbols. Several decoding approaches can be used depending on the required performance level and processing capabilities of receivers. The optimal decoding approach for uniformly distributed information symbols is known as the maximum-likelihood (ML) decoding. It provides the minimum probability of detection error. According to a ML decoder, the vector of information symbols that is closest to the received signal is favored (i.e. vector having the minimum Euclidean Distance with respect to the received signal).

One implementation of the ML decoding criterion uses an exhaustive search over all the possible values in the constellation alphabet. This method provides optimal performance. However, it requires a high complexity that increases as the size of the constellation codebook or the number of the transmit antennas becomes higher, thereby making the implementation of such techniques impossible in practical systems. The implementation of such ML decoding techniques is thus impossible in practical systems requiring a high constellation order to guarantee a high spectral efficiency as well as an increasing number of antennas for ensuring a higher diversity order.

Other ML criterion-based decoding techniques have been proposed to properly decode the received signal while considering the decoder complexity, such as the Sphere Decoder ("E. Viterbo and J. Boutros. A universal lattice code decoder for fading channels. IEEE Transactions on Information Theory, 45(5):1639-1642, July 1999") or the Schnorr-Euchner decoder ("C. P. Schnorr and M. Euchner. Lattice basis reduction: Improved practical algorithms and solving subset sum problems. In Math. Programming, pages 181-191, 1993"). However, these decoders have an increasing complexity as the constellation size or the number of antennas increases. Other suboptimal low-complexity decoders, such as the ZF (Zero-Forcing), the ZF-DFE (Zero Forcing-Decision Feedback Equalizer) and the MMSE (Minimum Mean Square Error) decoder are implemented in practical systems but present poor performances in terms of the achievable diversity order and on the error performance.

Still other decoding algorithms applicable in linear communication systems, using single or multiple users and/or single or multiple antennas, include the lattice sequential decoders (such as the "stack" decoder) which implement the optimal ML decoding criterion using a tree representation of the ML optimization problem (decoding tree) and a tree search. Such decoding algorithms provide a reduced complexity with respect to the exhaustive search approach. According to the search strategy implemented by sequential decoders, the expanded tree nodes are stored in a global stack. In particular, the stack decoder stores, in the global stack, the tree nodes expanded during the decoding process and sorts them according to an increasing order of their decoding metrics.

Sequential decoders include decoders implementing a Best-First tree search such as the Stack decoder as disclosed in:

"A. R. Murugan, H. El-Gamal, M.-O. Damen, and G. Caire. A unified framework for tree search decoding: Rediscovering the sequential decoder. *IEEE Transactions on Information Theory*, 52(3):933-953, March 2006";

"F. Jelinek. Fast sequential decoding algorithm using a stack. *IBM J. Res. Dev.*, 13(6):675-685, November 1969".

Another type of lattice sequential decoding method using a Best-First tree search is known as the Fano decoding method as disclosed in "R. Fano. A heuristic discussion of probabilistic decoding. *IEEE Transactions on Information Theory*, 9(2):64-74, April 1963".

Sequential decoders improve the overall decoding complexity. However, for an increasing constellation size and a high number of antennas, the stack decoding technique requires a high computational complexity. In order to reduce this complexity, another decoding technique referred to as the Spherical-Bound Stack decoder (SB-Stack) has been proposed in the article by G. R. Ben-Othman, R. Ouertani, and A. Salah, entitled "The Spherical Bound Stack Decoder", In Proceedings of International Conference on Wireless and Mobile Computing, pages 322-327, October 2008. The SB-stack approach combines the Stack search strategy with the Sphere Decoder search region: the decoder searches for the closest vector inside a sphere centered at the received point implementing the stack decoding strategy. The spherical search region imposes a search interval for each decoded symbol. Only nodes belonging to these intervals at each tree level are visited and expanded.

Lattice sequential decoders have strongly imposed themselves as optimal decoding schemes in linear wireless communication systems reducing the optimal ML decoding problem to the search for the path in a graph-tree having the least cumulated metric.

In a conventional sequential decoder, to determine a best fit (path), a value depending on the ML metric is assigned to each node in the tree (called "metric").

In some conventional approaches, the path metric for each node at a given level k of the decoding tree may be reduced of a term "b×k" which depends on a bias term b and on the level k.

The bias term allows controlling the amount of computations performed by the decoder. Also, the bias term makes it possible to achieve performance-complexity tradeoffs of the decoder.

With the introduction of a bias term b in the ML metric, parameterized sequential decoders including the Stack, Fano and SB-Stack decoders, offer a flexibility in terms of performance-complexity tradeoff. However, the selection of the bias in spatially multiplexed and coded MIMO systems is generally fixed deterministically without taking into account the channel statistics or the noise level. In other approaches using convolutional codes, such as the approach disclosed in "R. Fano. A heuristic discussion of probabilistic decoding. IEEE Transactions on Information Theory, 9(2):64-74, April 1963", an optimized value for the bias is defined which corresponds to the coding rate of the underlying code. For convolutional lattice coding joint to Tomlinson-Harashima shaping, as described in "O. Shalvi, N. Sommer, and M. Feder, Signal codes: Convolutional lattice codes, IEEE Transactions on Information Theory, 57(8):5203-5226, August 2011", the optimized value of the bias for high SNR regime is defined as $$\sigma^2 \log\left(\frac{4}{\pi\sigma^2}\right),$$

with $\sigma^2$ designating the variance of the additive noise affecting the transmission channel.

However, in the existing approaches, the value of the bias parameter is the same for all the tree levels. This results in an insufficient flexibility in terms of performance/complexity.

SUMMARY

In order to address these and other problems, there is provided a decoder for decoding a signal received through a transmission channel in a communication system, the signal carrying information symbols selected from a given set of values and being associated with a signal vector, the transmission channel being represented by a channel matrix. The decoder comprises:
- a sub-block division unit configured to divide the received signal vector into a set of sub-vectors in correspondence with a division of a matrix related to the channel matrix;
- at least one weighting coefficient calculation unit configured to calculate a sub-block weighting coefficient for each sub-vector,
- at least one symbol estimation unit for recursively determining estimated symbols representative of the transmitted symbols carried by the data signal from information stored in a stack.

The at least one symbol estimation unit is configured to apply at least one iteration of a sequential decoding algorithm, the sequential decoding algorithm comprising iteratively filling a stack by expanding child nodes of a selected node of a decoding tree comprising a plurality of nodes, each node of the decoding tree corresponding to a candidate component of a symbol of at least a part of the received signal and each node being assigned an initial metric. The symbol estimation unit is further configured to calculate a modified metric for at least one node of the expanded child nodes from the metric associated with the at least one node and from the sub-block weighting coefficient calculated for the sub-vector to which the at least one node belongs, the symbol estimation unit being configured to assign the modified metric to the at least one node.

In one embodiment, the decoder may be configured to previously determine an orthogonal matrix Q and an upper triangular matrix R by performing a QR decomposition from the channel matrix, and the sub-block division unit may be configured to divide the upper triangular matrix R into a number of upper triangular sub-matrices and a number of rectangular sub-matrices, the number of upper triangular sub-matrices being greater than or equal to two, the sub-block division unit being configured to divide the received signal vector into a set of sub-vectors such that each sub-vector of the received signal vector corresponds to one of the upper triangular sub-matrices.

The decoder may be configured to determine the received signal vector by multiplying the transpose matrix of the orthogonal matrix with the received signal.

In certain embodiments, the at least one symbol estimation unit may be configured to recursively determine at least one estimate of each sub-block of the transmitted signal corresponding to each sub-vector, each estimate of a given sub-block being determined from at least one estimate of the previously processed sub-blocks, the symbol estimation unit being configured to apply at least one iteration of a sequential decoding algorithm to determine at least one estimate of each sub-block of the transmitted signal using the at least one estimate of the previously processed sub-blocks.

The sub-block weighting coefficient calculated for a given sub-block is the same for each sub-block.

Alternatively, the sub-block weighting coefficient calculated for a given sub-block may be a function of at least some of the sub-block weighting coefficients determined for the previously estimated sub-blocks.

In one embodiment, the sub-block weighting coefficient calculated for a given sub-block may be a function of the signal-to-noise ratio.

Alternatively or in addition, the sub-block weighting coefficient may be a function of a sub-block parameter chosen in the group consisting of the level of the part of the decoding tree corresponding to the sub-block, and the size of the sub-block.

In another embodiment, the sub-block weighting coefficient may be a function of a division parameter chosen in the group consisting of the number of sub-blocks, and the order of the sub-blocks.

In still another embodiment, the sub-block weighting coefficient may be a function of the diagonal components of the upper triangular sub-matrix corresponding to the sub-block.

In certain embodiments, the modified metric calculation unit may be configured to reduce the initial metric by the sub-block weighting coefficient.

The modified metric calculation unit may be configured to calculate a modified metric for each expanded child node.

The modified metric calculation unit may be configured to calculate a modified metric for each node of the selected set of expanded child nodes.

The metric determination unit may be configured to assign the initial metric to each expanded node, and the modified metric calculation unit may be configured to calculate a modified metric for each node stored in the stack, in response to the detection of a stack reordering condition, the decoder being further configured to reorder the stack by increasing values of the modified metrics associated with the nodes of the stack.

The modified metric calculation unit may be configured to calculate a modified metric for each expanded child node in response to the triggering of a termination alarm.

In certain embodiments, the sequential decoding algorithm may be chosen in a group consisting of a stack decoding algorithm, a Fano decoder, a decoder implementing the M-algorithm and a SB-stack decoding algorithm.

There is also provided a receiver for receiving and decoding an encoded signal, the receiver comprising a decoder according to any preceding embodiment for decoding the signal.

There is further provided a mobile device capable of transmitting and receiving data in a wireless communication network, the mobile device comprising a receiver according to certain embodiments for receiving a signal.

The invention also provides a method of decoding a signal received through a transmission channel in a communication system, the signal carrying information symbols selected from a given set of values and being associated with a signal vector, the transmission channel being represented by a channel matrix, wherein the method comprises:

- dividing the received signal vector into a set of sub-vectors in correspondence with a division of a matrix related to the channel matrix;
- calculating a sub-block weighting coefficient for each sub-vector,
- for recursively determining estimated symbols representative of the transmitted symbols carried by the data signal from information stored in a stack.

The step of recursively determining estimated symbols comprises applying at least one iteration of a sequential decoding algorithm, the sequential decoding algorithm comprising iteratively filling a stack by expanding child nodes of a selected node of a decoding tree comprising a plurality of nodes, each node of the decoding tree corresponding to a candidate component of a symbol of at least a part of the received signal and each node being assigned an initial metric. The step of recursively determining estimated symbols further comprises calculating a modified metric for at least one node of the expanded child nodes from the metric associated with the at least one node and from the sub-block weighting coefficient calculated for the sub-vector to which the at least one node belongs, the method comprising assigning the modified metric to the at least one node.

There is further provided a computer program product for decoding a signal received through a transmission channel in a communication system, the signal carrying information symbols selected from a given set of values and being associated with a signal vector, the transmission channel being represented by a channel matrix, the computer program product comprising:

- a non-transitory computer readable storage medium; and
- instructions stored on the non-transitory computer readable storage medium that, when executed by a processor, cause the processor to:
  - divide the received signal vector into a set of sub-vectors in correspondence with a division of a matrix related to the channel matrix;
  - calculate a sub-block weighting coefficient for each sub-vector,
  - recursively determine estimated symbols representative of the transmitted symbols carried by the data signal from information stored in a stack.

The processor is caused to recursively determine estimated symbols by applying at least one iteration of a sequential decoding algorithm, the sequential decoding algorithm comprising iteratively filling a stack by expanding child nodes of a selected node of a decoding tree comprising a plurality of nodes, each node of the decoding tree corresponding to a candidate component of a symbol of at least a part of the received signal and each node being assigned an initial metric, the processor being further caused to calculate a modified metric for at least one node of the expanded child nodes from the metric associated with the at least one node and from the sub-block weighting coefficient calculated for the sub-vector to which the at least one node belongs, and assign the modified metric to the at least one node.

Further advantages of the present invention will become clear to the skilled person upon examination of the drawings and detailed description. It is intended that any additional advantages be incorporated herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
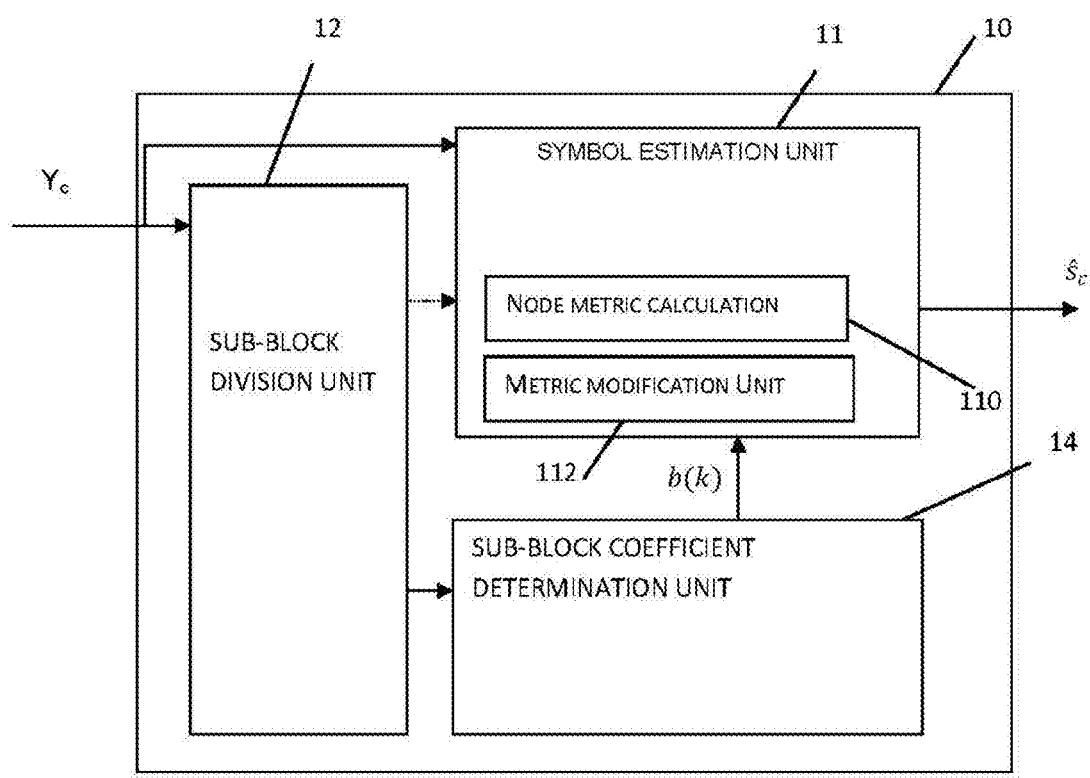
FIG. 1 schematically represents a decoder according to certain embodiments.

Referring to FIG. 1, there is shown a decoder 10 according to certain embodiments of the invention.

The decoder 10 is configured to decode a signal Yc received through a transmission channel in a communication system, by applying at least one iteration of a decoding algorithm and determine an estimate of the transmitted signal $\hat{s}_c$. The received signal carries information symbols selected from a given set of values and being represented by a signal vector (for example from a constellation alphabet). The transmission channel is represented by a channel matrix H (also referred to as "a channel state matrix").

Sequential decoding is based on searching candidate nodes in a decoding tree, according to the closest lattice point search problem, and filling in parallel an ordered list or stack of previously examined paths of different lengths. The following description will be made with reference to a "stack" for illustrative purpose although equivalent data structures may be used.

According to certain embodiments, the decoder 10 comprises at least one symbol estimation unit 11 for recursively determining estimated symbols representative of the transmitted symbols carried by the data signal from information stored in a stack, the symbol estimation unit 11 applying at least one iteration of a sequential decoding algorithm (also referred to as "sequential decoding steps"). The sequential decoding algorithm is applied to iteratively fill the stack by expanding child nodes of a selected node of a decoding tree comprising a plurality of nodes, each node of the decoding tree corresponding to a candidate component of information symbols carried by at least a part of the received signal.

Sequential decoding may be based on the QR decomposition of the channel state matrix H.

The decoding tree (also referred to as "search tree" or "logic tree") forms a data structure representing the different values taken by the coordinates (components) of the constellation points that can belong for example to a $2^q$ QAM constellation. The decoding tree comprises a plurality of nodes representing possible components of information symbols carried by the received data signal (the received data signal may be represented according to a real-valued representation for example). Nodes in the decoding tree represent the different possible values of the symbols carried by at least a part of the received data signal. In the following description of certain embodiments, the symbols will be noted $s_i$, where $s_i$, with i representing an integer ranging from n to 1, represent the real and imaginary components of the transmitted vector of information symbols.

The decoding tree comprises a plurality of levels, branches and paths. As used herein, a level of a node corresponds to the rank of a decoded information symbol in the vector of symbols. In the following description of certain embodiments of the invention, by convention, the level of a node will correspond to a reverse order of the symbols in the vector of information symbols. Accordingly, the nodes located in the first level of the tree correspond to the last component of the vector of information symbols, the second level corresponds to the penultimate component of the vector of information symbols, and so on. A node that does not have any child node (a child node is also referred to as "successor") is referred to as a "leaf" node and is located in the lowest level of the tree is referred to as a leaf node. Branches depart from a virtual node called 'root node' (the root node is the highest node in the tree and does not have any parent node). A branch forms a connection between two nodes located in two consecutive levels. Each branch may be associated with a metric function representing a partial Euclidean Distance. The depth (or dimension) of a given node designates the length of the path from this given node up to the root node of the decoding tree. For a vector of n transmitted information symbols (in real value representation), a leaf node designates a node in depth n. Each path from the root node to a leaf node corresponds to a possible value of the vector of original information symbols (possible transmitted signal). The Euclidean Distance between the received signal and a possible transmitted signal corresponds to the metric function of the corresponding leaf node (a metric may be also referred to hereinafter as a "cost"). Accordingly, the ML solution corresponds to the path in the decoding tree having the lowest metric function. The metric of a node may be defined, for the data signal being considered, by a numerical value.

In the following description of certain embodiments, the child nodes of a node $s_k$ will be designated by the components $s_{k-1}$ and a path of depth i in the tree will be designated by the vector $(s_n, s_{n-1}, \ldots, s_i)$ of length (n−i+1).

A sequential decoding algorithm stores a selected set of the expanded nodes in a stack, each node being stored in the stack in association with a corresponding metric.

The stack thus comprises candidate nodes, each node being maintained in the stack along with its assigned metric. An iteration of a decoding algorithm may recursively extend the top node in the stack until reaching a leaf node of the tree or meeting a termination condition.

The symbol determination unit 11 may comprise a node metric calculation unit110 for determining an initial metric for at least one node among the expanded child nodes. The initial metric may be assigned to the node. The initial metric may represent a function of the Euclidean distance between the received signal and the vector of symbols represented by the path between the root node and the node.

The symbol determination unit 11 may further comprise a metric modification unit 112 for calculating a modified metric for at least one node among the expanded child nodes, and assigning the modified metric to the node, the modified metric being calculated from the initial metric of the node and a sub-block weighting coefficient b(k) calculated for the sub-block of the received information symbols to which the node belongs to.

Depending on the application of the invention, each expanded child node may be assigned either the initial metric or the modified metric.

The decoder may comprise a sub-block division unit 12 configured to divide the received signal vector into a set of sub-vectors in correspondence with a division of a matrix related to the channel matrix H, each sub-vector corresponding to a sub-block of the information symbols $s^{(k)}$ comprised in the received signal. In certain embodiments, the matrix related to the channel matrix H may be the upper triangular matrix R obtained from a QR decomposition of the channel matrix H, Q designating an orthogonal matrix.

The decoder 10 may further comprise a sub-block coefficient determination unit (12) configured to calculate a sub-block weighting coefficient b(k) for each sub-block of information symbols $s^{(k)}$.

In certain embodiments, the sub-block weighting coefficients may have a same value for all or a subset of sub-blocks. Alternatively, the value of the sub-block weighting coefficient for a given sub-block $s^{(k)}$ may be determined depending on different parameters such as on one or more sub-block parameters related to the sub-block and/or on one or more division parameters related to the division of the information symbols into sub-blocks (for example number of blocks, size of the sub-blocks, lengths of the sub-blocks, etc.) and/or the sub-block weighting coefficients determined for one or more other sub-blocks. The weighting coefficient b(k) may further take into account the SNR (Signal To Noise Ratio) value and/or the channel fading.

The sub-block weighting coefficient for a given sub-block may depend on the weighting coefficients used in remaining sub-blocks.

By applying a sub-block-based weighting coefficient to modify the metric of an expanded node during the execution of the sequential decoding steps, nodes located at sub-blocks leading to promising nodes may be favored. Such flexibility allows improving performance/complexity tradeoffs.

The weighting coefficient may further depend on the entries of the divided sub-matrices of the upper triangular matrix R. For example, a high weighting coefficient may be associated to a sub-block of index k if the corresponding feedback sub-matrices $B^{(jk)}$ comprise a high number of non-zero entries. The feedback matrices defining the interference between the sub-vectors of information symbols, taking into account the number of zero entries of these matrices for deriving the weighting coefficient enables for reducing error propagation, thus decreasing the error rate.

In one embodiment, the metric modification unit 112 may determine a modified metric by subtracting the sub-block weighting coefficient from to the initial metric of the considered node.

In certain embodiments, a modified metric may be determined for each child node expanded during each iteration.

Alternatively, a modified metric may be computed for each node stored in the stack, the nodes being then reordered by modified metrics in response to the triggering of a stack reordering activation condition.

Still alternatively, the sequential decoding algorithm may start the decoding by assigning an initial metric to each expanded child node, at each iteration of the decoding steps, until a termination alarm is triggered. The sequential decoding algorithm may then continue the decoding by computing a modified metric for each expanded child node using the sub-block weighting coefficients to enable early termination of the decoding.

The present invention may be implemented in a wireless linear communication system. The communication system may comprise at least a transmitter for transmitting simultaneously a plurality of information symbols through a communication channel, and at least a receiver for receiving the information symbols transmitted by the transmitter in the form of independent signals.

The present invention may be implemented in a wireless communication system for decoding information data. The communication system comprises at least a transmitter for transmitting simultaneously a plurality of information symbols through a communication channel, and at least a receiver for receiving the symbols transmitted by the transmitter(s) in the form of independent signals. The communication channel may be any linear AWGN (Additive White Gaussian Noise) channel or a multipath channel. In addition, the communication system may use single or multicarrier modulation formats such as OFDM (Orthogonal Frequency-Division Multiplexing) modulation adopted in wireless standards like IEEE 802.11 (WiFi), or FBMC (Filter Banck Multicarrier). Multicarrier communication techniques are used to combat frequency-selective channels and manage interference and delays. Further, the communication system may integrate multiple access techniques used to provide access to the different system resources in the presence of multiple transmitters/receivers. Examples of multiple access techniques comprise CDMA (Code division multiple access), or FDMA (Frequency Division Multiple Access) used in optical communication systems.

One embodiment of the invention can be integrated in a receiver, for example for the decoding of data transmitted in a MIMO (Multiple Input Multiple Output) channel, according to any MIMO configuration, or for the detection of multiple users.

In other applications of the invention, the communication system may be an optical fiber-based communication system such as a Polarization Division Multiplexing-OFDM (PDM-OFDM) system used for example as a telecommunication medium in access networks, metropolitan networks, or in computer networks.

When applied to MIMO decoding in a MIMO communication system, for a single user or multiple users decoding, the dimension of the received signal or channel output depends on the dimension of the signal space at the transmitter, on the number ($n_t$) of the Transmit (Tx) antennas and/or on the number ($n_r$) of Receive (Rx) antennas.

The MIMO system may present a centralized configuration where the transmit antennas are collocated at a same user. Alternatively, the MIMO system may be a distributed MIMO system (or multi-user MIMO) where the transmit antennas are distributed in the communication network and are located at different users. Such multi-user MIMO configurations may be used for example in mobile networks in the uplink communications applied for example in cellular 3G, 4G and LTE standards or in cooperative communications applied for example in ad-hoc networks (wireless sensor networks, machine-to-machine communications, internet of things . . . ).

The wireless network environment may comprise a plurality of base stations (also referred to as "nodes" or "access points" or "cells" depending on the application context of the invention), each base station including a transmitter and a receiver including one or more antennas. Each station may communicate with other stations through a wireless connection.

Figure 2:
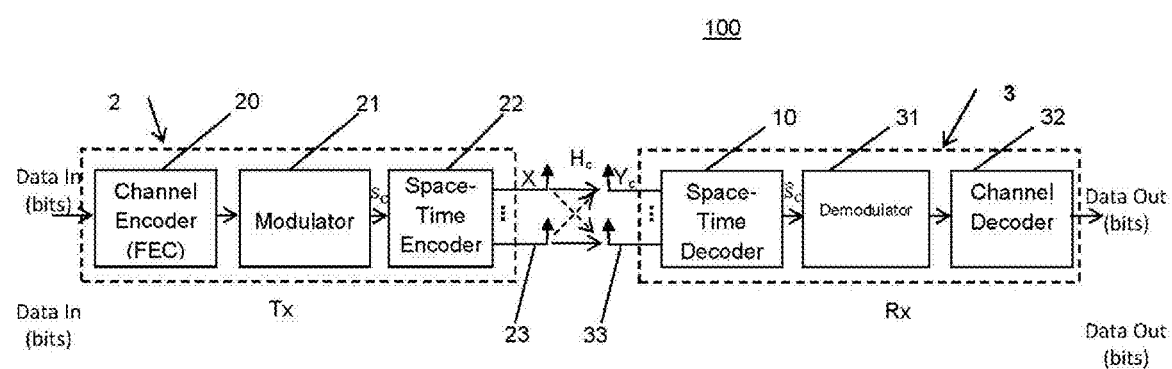
FIG. 2 schematically represents an exemplary communication system implementing the decoding method.

Referring to FIG. 2, an exemplary wireless communication system 100 between a transmitter and a receiver in which a MIMO transmission is used, implementing an STBC (Space Time Block Code) code in transmission to distribute the symbols modulated over various degrees of freedom of the channel. Each transmitter 2 of a station may exchange data with a receiver 3 of another station according to the wireless communication system. The wireless network 100 may rely on a centralized architecture (a controller is provided to control the operation of the base stations) or a decentralized architecture (the base stations may communicate directly with one another). User Terminals (such as wireless devices, cellular phones, personal digital assistants, etc.), may communicate with one or more base stations on the forward link or on the reverse links. The user terminals may be fixed or mobile.

The MIMO configuration may be symmetric, in which case it includes a same number ($n_t$) of transmit antennas as the number ($n_r$) of receive antennas. Alternatively, the MIMO configuration may be asymmetric, in which case the number ($n_t$) of transmit antennas is different from the number ($n_r$) of receive antennas (in particular the number $n_r$, at the receive side, is higher than $n_t$, at the transmit side to avoid a rank deficiency).

The transmitter 2 can transmit a signal to a receiver 3 by means of a noisy MIMO channel. The data transmitter 2 can in particular be integrated in the base stations. The transmitter 2 may comprise for example:
a channel coder 20 for providing convolutional codes,
a modulator 21 such as a QAM modulator for delivering symbols;
a space/time encoder 22 for delivering a code word;
$n_t$ transmit antennas 23, each transmit antenna being associated with an OFDM or FBMC modulator.

The transmitter 2 may be configured to code a binary signal received as input using a convolutional code provided by the channel coder 20. The signal is then modulated by the modulator 21 according to a modulation scheme (for example, a quadrature amplitude modulation $2^q$-QAM. The modulator 21 can also implement a modulation scheme generating complex symbols, each complex symbol belonging to a group of symbols $s_i$. The modulated symbols thus obtained are then coded by the space-time coder 22 to form an ST code word, such as the Golden Code ("The Golden Code: A 2×2 Full-Rate Space-Time Code with Non-Vanishing Determinants", J.-C. Belfiore, G. Rekaya, E. Viterbo, IEEE Transactions on Information Theory, vol. 51, no. 4, pages 1432-1436, April 2005). The STB code may be based on a complex matrix of dimension $n_t*T$, in which $n_t$ designates the number of transmission antennas and T is the time length of the STB code, or on a spatial multiplexing (the modulated symbols are directly sent to the transmission antennas).

The code word thus generated is converted from the time domain to the frequency domain and distributed over the $n_t$ transmission antennas. Each dedicated signal is then modulated by a respective OFDM or FBMC modulator, and transmitted over the corresponding transmit antenna 23, optionally after filtering, frequency transposition and amplification.

The receiver 3 can be also integrated in the base stations. The receiver 3 may be configured to receive a signal y transmitted by the transmitter 2 in a wireless channel. The channel may be noisy (for example channel with Additive White Gaussian Noise (AWGN) subjected to fading). The signal transmitted by the transmitter 2 may be further affected by echoes due to the multiple paths and/or the Doppler effect due to the transmitter and receiver having a non-zero relative velocity.

The receiver 3 may be integrated in a base station such as a Node-B in a cellular network, an access point in a local area network or ad-hoc networks or any other interfacing device operating in a wireless environment. The receiver 11 may be fixed or mobile. In one exemplary embodiment, the receiver 3 may comprise:

$n_r$ receive antennas 33 for receiving the signal y, each receive antenna being associated with a respective OFDM or FBMC demodulator; the OFDM or FBMC demodulators ($n_r$ demodulators) are configured to demodulate the received signal observed at each receiving antenna and delivering demodulated signals. A frequency/time converter may be used to perform a reverse operation of the time/frequency conversion implemented in transmission, and to deliver a signal in the frequency domain;

a space/time decoder 10 configured to deliver a decoded signal according to the embodiments of the invention;

a demodulator 31 configured to perform a demodulation associated with a decoding.

In one application of the invention to a Rayleigh fading wireless multi-antenna system to decode a signal received by the multi-antenna system (MIMO), with $n_t$ transmit and $n_r$ receive antennas using spatial multiplexing, the data signal $y_c$ received as a complex-value vector, according to a complex-valued representation of the channel output is given by:

$$y_c = H_c s_c + w_c \quad (1)$$

In Equation (1), $H_c \in \mathbb{C}^{n_t \times n_r}$ designates the complex value of the channel matrix H of elements drawn according to the distribution $\mathbb{C}(0,1)$, $s_c$ designates the complex value of the vector s representing the transmitted data signal vector and $w_c \in \mathbb{C}^{n_r}$ designates the complex value of the additive white Gaussian noise vector w. The received signal $y_c$ may be then transformed into a real-value representation, for example according to equation (2):

$$y = \begin{bmatrix} \mathcal{R}(H_c) & -\mathcal{I}(H_c) \\ \mathcal{I}(H_c) & \mathcal{R}(H_c) \end{bmatrix} \begin{bmatrix} \mathcal{R}(s_c) \\ \mathcal{I}(s_c) \end{bmatrix} + \begin{bmatrix} \mathcal{R}(w_c) \\ \mathcal{I}(w_c) \end{bmatrix} \quad (2)$$

In equation (2), $\mathcal{R}(.)$ and $\mathcal{I}(.)$ denote respectively the real and imaginary parts of a complex-value input (vector or matrix).

The equivalent channel output can then be written as:

$$y = Hs + w \quad (3)$$

In embodiments where a Space-Time code of length T is used, the channel output can be written in the same form of equation (3) with the equivalent channel matrix $H_{eq}$ given by:

$$H_{eq} = H_c \Phi \quad (4)$$

In equation (4), $\Phi \in \mathbb{C}^{n_t T \times n_t T}$ corresponds to the coding matrix of the underlying code. For ease of presentation and given that both uncoded and coded schemes result in a same real-valued lattice representation, the following description will be made with reference to the spatial multiplexing and symmetric case with $n_t = n_r$ and $n = 2n_t$.

According to the equivalent system obtained in (3), the received signal can be viewed as a point of the lattice generated by H and perturbed by the noise vector w.

When optimal decoding is required, the receiver implements an ML decoder that attempts to determine, given the channel output and the channel matrix, an estimate $\hat{s}$ of the originally transmitted symbols vector from the given data in H and y, according to the minimization of the error probability such that:

$$\hat{s} = \mathcal{A}^n P_r(\hat{s} \neq s) \quad (5)$$

In Equation (5), the finite subset $\mathcal{A}$ represents the alphabet to which belong the real and imaginary parts of the information symbols. For example, using an $2^M$-ary QAM constellation to construct the complex information symbols, the alphabet is the integer sub-set given by $\mathcal{A} = [-(M-1), (M-1)]$ ($\mathcal{A}$ may represent for example a M-ary QAM constellation to which belongs the complex information symbol). The minimization of the error probability under ML decoding is equivalent to the minimization problem given by:

$$\hat{s} = \mathcal{A} \|y - Hs\|^2 \quad (6)$$

Assuming coherent system where H is perfectly known or estimated at the receiver, optimal ML decoding reduces to solve a closest vector problem in the n-dimensional lattice generated by H to seek the nearest lattice point to the equivalent received signal y according to the minimization problem of Equation (6).

Thus the ML decoder chooses the symbol vector s which yields the smallest Euclidean distance between the received vector y, and hypothesized message Hs. The ML decoder represents a discrete optimization problem over candidate vectors s within the a selected set of values such as a chosen alphabet. In the case of high constellations size and high dimension of the system (number of antennas), the search for the ML solution in an exhaustive way generally requires a very high complexity.

Sequential decoders implementing a tree search strategy searches the closest lattice point to the received vector using a decoding tree structure. Before transmission of the signal to such a sequential decoder, a predecoding may be performed using a QR decomposition of the channel matrix such that H=QR where Q designates an orthogonal matrix and R designates an upper triangular matrix. Given the orthogonality of Q, equation (3) can be rewritten in the following form:

$$\tilde{y} = Q^t y = Rs + Q^t w \quad (7),$$

By denoting $\tilde{w} = Q^t w$, equation (7) can be rewritten:

$$\tilde{y} = Rs + \tilde{w} \quad (8)$$

The ML decoding problem then amounts to solving the equivalent system given by:

$$\hat{s} = \mathcal{A}^n \|\tilde{y} - Rs\|^2 \qquad (9)$$

The triangular structure of R thus reduces the search of the closest point to a sequential tree-search. Nodes in the tree represent the different possible values of the symbols $s_i$.

Figure 3:
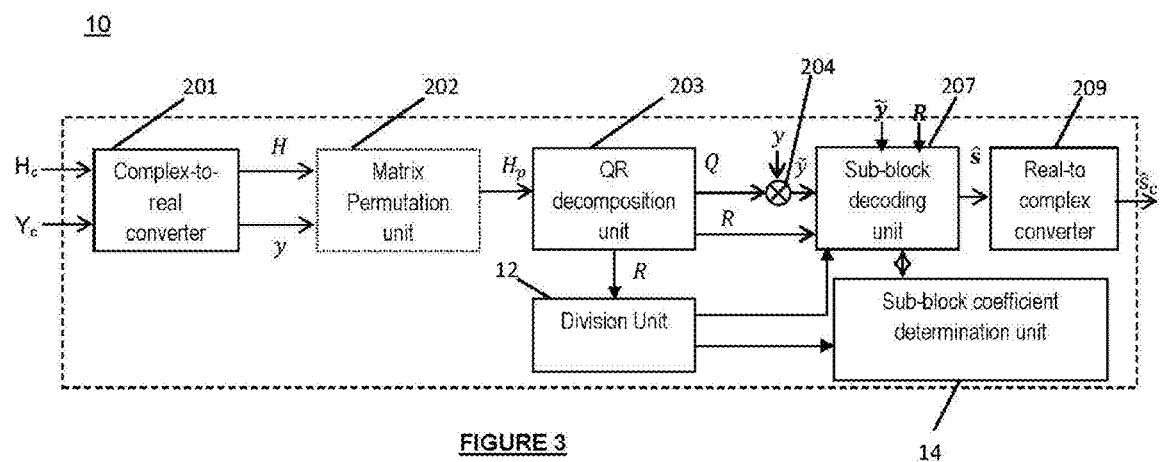
FIG. 3 is a block-diagram representing the structure of the decoder according to certain embodiments.

FIG. 3 is a block diagram representing the Space Time decoder 10 according to certain embodiments.

The decoder 10 may comprise a complex-to-real converter 201 configured to convert the complex-value channel matrix $H_c$ into a real-value equivalent channel state matrix H, and convert the complex-value channel output $Y_c$ into a real-value vector y.

The decoder 10 may further comprise a QR decomposition unit 203 for performing a QR decomposition of the channel matrix such that H=QR where Q designates the orthogonal matrix and R designates the upper triangular matrix. The decoder 10 may further comprise a modifier unit 204 to rewrite the received signal vector y into an equivalent received signal vector $\tilde{y} = Rs + Q^t w$.

In certain embodiments, the decoder 110 may also comprise a matrix permutation unit 202 to permute columns or rows of the channel matrix H prior to the QR decomposition.

The decoder 10 may comprise a division unit 12 configured to divide the upper triangular matrix R into N upper triangular sub-matrices $R^{(k)}$, k=1, ..., N and $$\frac{N(N+1)}{2}$$

rectangular sub-matrices $B^{(kj)}$, k=1, ..., N; j=k, ..., N.

The division unit 12 may further divide to the vector of symbols s to obtain N sub-vectors $s^{(k)}$, k=1, ..., N of lengths $l_k$ such that $$s = \begin{bmatrix} s^{(1)} \\ \vdots \\ s^{(N)} \end{bmatrix}.$$

The upper triangular matrix R is thus divided into $$N + \frac{N(N+1)}{2}$$

matrices composed of N upper triangular sub-matrices $R^{(k)}$, k=1, ..., N and $$\frac{N(N+1)}{2}$$

rectangular sub-matrices $B^{(jk)}$, k=1, ..., N; j=k, ..., N such that:

$$R = \begin{bmatrix} R^{(1)} & \cdots & B^{(1,N-1)} & B^{(1N)} \\ 0 & \cdots & \vdots & \vdots \\ 0 & 0 & R^{(N-1)} & B^{(N-1,N)} \\ 0 & 0 & 0 & R^{(N)} \end{bmatrix} \qquad (10)$$

Each upper triangular sub-matrix $R^{(k)}$, k=1, ..., N represents a square matrix of dimension $l_k \times l_k$ and corresponds to the sub-vector $\tilde{y}^{(k)}$, k=1, ..., N. Further, each sub-matrix $B^{(jk)}$, k=1, ..., N; j=k, ..., N represents a rectangular matrix of dimension $l_k \times l_j$ and corresponds to a feedback matrix from block j to block k.

The sub-block coefficient determination unit 14 is configured to determined a sub-block weighting coefficient b(k) associated with each sub-block $s^{(k)}$, as determined by the division unit 12. In certain embodiments, the sub-block coefficient determination unit 14 may use at least one division parameter such as the number N of sub-blocks, and/or data related to the size $l_k$ of at least some of the sub-blocks to determine the sub-block weighting coefficient. The sub-block weighting coefficients b(k) (also noted $b(s^{(k)})$) may be determined dynamically during the execution of each iteration of the sequential decoding algorithm or pre-computed. In embodiments where the sub-block weighting coefficients b(k) are pre-computed, the sub-block weighting coefficients b(k) may be stored in a data structure in association with the corresponding sub-block $s^{(k)}$.

Figure 4:
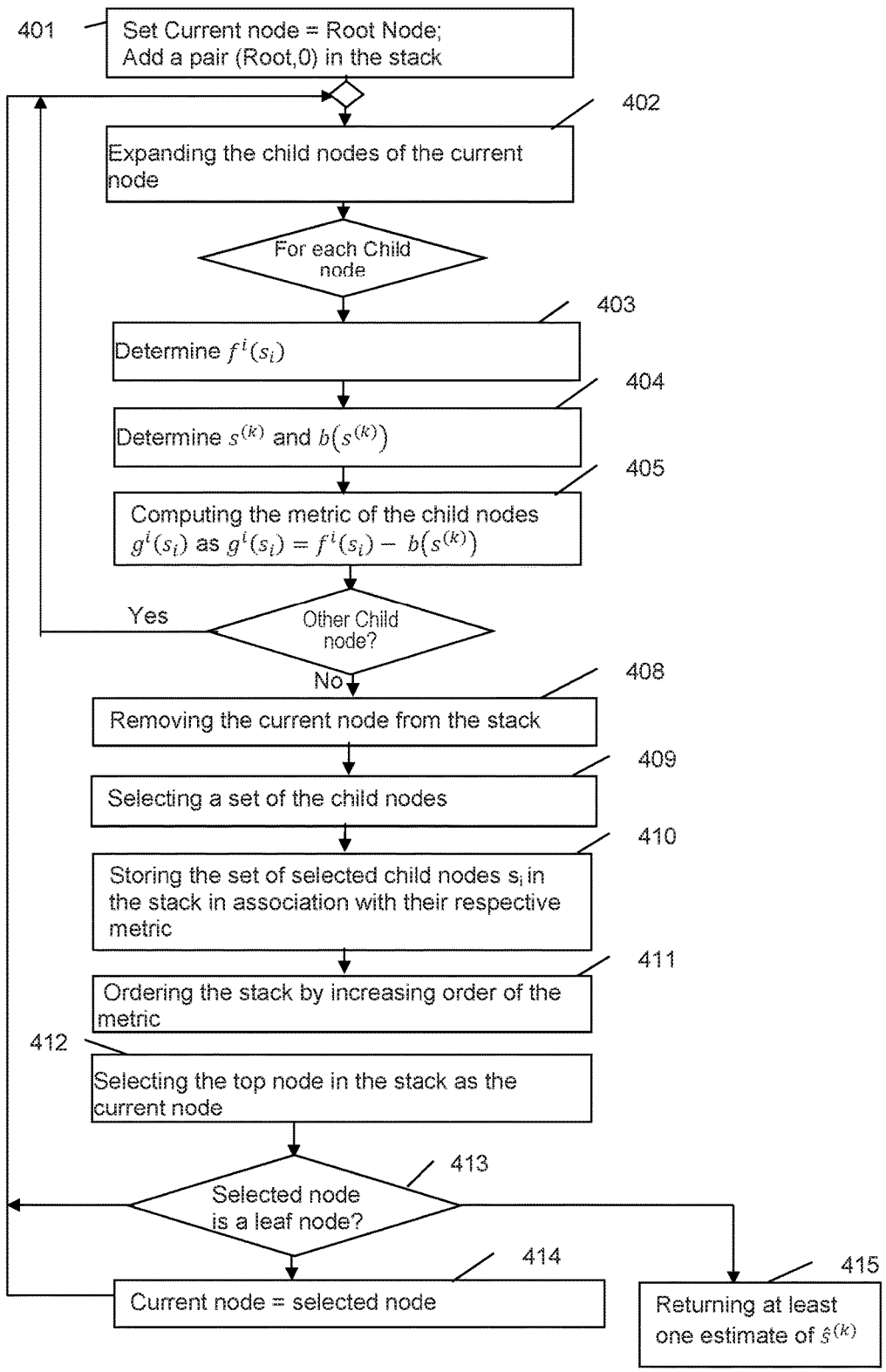
FIG. 4 is a flowchart depicting a sequential sub-block decoding method according to one embodiment.

Referring now to FIG. 4, a flowchart is presented that depicts a sequential decoding method which may be executed by the receiver 3 according to certain embodiments. A sequential decoding method uses a sequential decoding tree for decoding a received data signal, corresponding to a transmitted data signal transported by a transmission channel associated with a channel matrix H.

The search tree (also referred to as "the decoding tree" hereinafter) may be generated through a QR decomposition of the channel matrix H (H=QR) in a pre-decoding phase as described above, where $Q^t$ represents an orthogonal matrix and R represents the generator matrix (also referred to as the "equivalent channel matrix") in the decoding equivalent system, and through a multiplication of the received signal by $Q^t$. Given the upper triangular structure of the matrix R, the ML optimization problem is solved by performing a tree-search based on the generation of the decoding tree. An empty stack or list may be also initialized.

In step 401, the root node is selected as the current node and a pair (Root, 0) is added to the stack at the top position.

In step 402, the child nodes (or descendent nodes) of the root node representing all the possibilities of the first symbol $x_1$ are generated.

In step 403, the initial metric of the child node $f^i(s_i)$. Is determined. The initial metric may be determined from the Euclidean distance $f^i(s_i)$ between the received signal and the path between the root node and the node considered.

In step 404, it is determined to which sub-block $s^{(k)}$ the current child node $s_i$ belongs and the sub-block weighting coefficient b(k) corresponding to the sub-block $s^{(k)}$ is determined (or alternatively retrieved if sub-block weighting coefficient b(k) has been previously computed).

In step 405, the modified metric of the child node $g^i(s_i)$ is calculated as:

$$g^i(s_i) = f^i(s_i) - b(k) \qquad (11)$$

The sub-block weighting coefficient value may be determined so as to favor the most advanced nodes in the tree. As a result, faster convergence of the decoding process is enabled allowing for reduced error decoding probability. In the decoding tree, there exists a single path between the root node and the child node being considered. From this path, it is thus possible to determine the corresponding decoded bits or an estimation of the transmitted information sequence transmitted between the root node and the child node considered.

Steps 403-405 are then iterated for each child node generated in step 402 (block 407).

When all the child nodes have been processed, in step 408, the node positioned at the top of the stack is removed from the stack. In the first iteration of the decoding steps, the top node is the root node.

In steps 409-410, all the child nodes or a set of the child nodes are inserted in the stack. Each child node $s_i$ is added in the stack together with its respective metric $g^i(s_i)$ determined in step 405. Additional data may be further inserted in the stack in association with each child node such as the path and/or the level of the child node in the tree.

In step 411, the nodes in the stack are sorted according to a decreasing order of the metrics $g^i(s_i)$ associated with nodes.

In step 412, the top node of the stack $s_{top}$ is selected as the current node in order to generate its child nodes.

In step 413, it is determined if the selected node is a leaf node. If the selected node is a leaf node (i.e. having no child node), the decoding method is terminated in step 415. The decoder may then return an estimate of the vector of symbols.

Otherwise, in step 414, the selected node is set as the current node and steps 401 to 414 may be repeated for the newly selected node (which represents the node having the lowest metric in the stack) to generate the child nodes, at a next level j of the decoding tree with j being comprised between n−1 to 1. The next processed level j depends on the top node selected in the stack.

Each iteration of steps 401 to 414 (corresponding to the processing of a current node) thus provides a path between the root node and a new leaf node stored in the stack.

The received signal may be estimated from the node information stored in the stack, and in particular the path(s) stored in the stack when such information is available. For example, if a symbol estimation (hard decision) is applied, the construction of the tree implements a single iteration of steps 401 to 414 enabling a single path to be determined corresponding to a hard estimation of the transmitted data signal. Alternatively, if a probabilistic estimation (soft decision) may be applied, the decoding method may deliver soft-output information in the form of Log-Likelihood Ratio (LLR) values. In this case, several iterations of steps 401 to 414 may be performed. Each iteration provides a different path from the root node to leaf nodes (representing a candidate lattice point). These different paths (representing candidate lattice points) may then be stored in an auxiliary stack together with their paths. A probabilistic estimation of the information signal can be determined based on these paths. The efficiency of soft-output decoding depends on the number of the candidate lattice points filled in the stack.

Advantageously, such an embodiment allows for providing reliable soft-output decisions by adapting the number of the candidate lattice points to a soft-output reliability metric, enabling better performance.

The initial metric $f'(s_i)$ (also referred to as "elementary node metric") associated with a child node $(s_i)$ computed in step 403 may be determined from the metrics of the nodes in the tree comprised in the path from the root node $s_n$ to the current node $s_i$.

The triangular structure of matrix R reduces the search of the closest point to a sequential tree-search. Nodes in the tree represent the different possible values of the symbols $s_i$, where $s_i$ for i=1, . . . , n represent the real and imaginary components of the information vector $s_c$. A tree branch may represents two consecutive nodes $(s_{i+1}; s_i)$.

Specifically, the metric $w_j(s_j)$ of a node at a level j of the tree can be determined as the Euclidean distance between the $j^{th}$ component of the vector $\tilde{y}$ representing the received signal and the vector $(s_n \ldots s_j)$ comprising the node values of the tree from the root node $s_n$ to the node $s_j$ at level j according to equation (11):

$$f'(s_j) = w_j(s_j) = |\tilde{y}_j - \Sigma_{k=j}^n R_{jk} s_k|^2 \qquad (11)$$

It should be noted that the cumulated metric $w(s_j)$ of a node $s_j$ represents the metric of the path defined from the root node $s_n$ to the node $s_j$ (i.e. sum of the metrics $w_j(s_j)$ of the nodes in the tree comprised in the path). It is therefore equal to the sum over all metrics for different nodes forming the path according to: $w(s_j) = \Sigma_{k=j}^n w_k(s_k)$. Using this definition, the ML metric minimization of equation (8) is equivalent to search for the path in the tree having the least cumulated metric.

The metric of equation (11) represents a metric for the branch $(s_{j+1}; s_j)$. Due to the triangular structure of matrix R, the search for candidate lattice points is started from the component $s_n$.

Accordingly, the node metric according to certain embodiments may be determined as:

$$g^i(s_j) = |\tilde{y}_j - \Sigma_{k=j}^n R_{jk} s_k|^2 - b(k) \qquad (12)$$

In equation (12), b(k) corresponds to the sub-block weighting coefficient b(k) associated with the sub-block $s^{(k)}$ of information symbols to which the node $s_j$ belongs.

In one embodiment, the sub-block weighting coefficient b(k) may be determined in step 404 as a function of the $R_{ii}^{(j)}$ components and in particular from the $i^{th}$ diagonal entry of the corresponding upper triangular sub-matrix $R^{(j)}$ obtained from the division of the upper triangular matrix R (resulting from the QR decomposition of the matrix derived from the channel matrix).

This allows favoring the nodes which are located at sub-blocks leading to promising nodes as the diagonal elements $R_{ii}^{(j)}$ of upper triangular sub-matrix $R^{(j)}$ characterize the channel quality. In order to faster the convergence of the algorithm, nodes located at sub-blocks with high values of channel fading $R_{ii}^{(j)}$ may be favored by allocating to them a small weighting coefficient.

The sub-block weighting coefficient b(k) may further take into account a parameter b which depends on the channel variance $\sigma^2$ as described in "Lattice Sequential Decoder for Coded MIMO Channel: Performance and Complexity Analysis". W. Abediseid and Mohamed Oussama Damen. CoRR abs/1101.0339 (2011):

$$b = \sigma^2 \log\left(\frac{4}{\pi\sigma^2}\right) \qquad (13)$$

The invention may be also applied to compute the metric of a node in an SB-stack decoder. The SB-stack decoder uses a tree representation of the ML decoding problem, each path from the root node to a leaf node being a possible transmitted signal: starting from the root node (from the highest dimension of the tree in a descending order), all or a subset of the child nodes $s_n$ are explored, and for each explored node a metric associated with the node is computed. Only the nodes having a value that satisfies a sphere constraint according to the following inequality (10) are generated and may be stored in a stack:

$$\|\tilde{y} - Rs\|^2 \geq C^2 \qquad (14)$$

Using the triangular structure of the ML decoding problem according to equation (14), the SB-stack decoder determines a set of lattice points inside a sphere $\mathcal{A}(y, C)$ centered at a point y representing the received signal y and having a radius C.

The inequality $\|\tilde{y}-Rs\|^2 \leq C^2$ can be rewritten as:

$$\|R\xi\|^2 \leq C^2 \qquad (15)$$

In Equation (15), R is a n×n matrix and $\xi$ is an n-dimensional vector.

The minimization problem (ML solution) $\min_{s \in A} \|\tilde{y}-Rs\|^2 \leq C^2$ can thus be rewritten:

$$\min_{s \in A} \|R\xi\|^2 \leq C^2 \qquad (15)$$

To limit the search region to the sphere of initial radius C, a search interval $I_i=[b_{inf,i}; b_{sup,i}]$ is defined for each decoded component $s_i$, the lower boundary $b_{inf,i}$ and the upper boundary $b_{sup,i}$ of the search interval $I_i$ being determined from the initial radius C.

This involves that only the nodes having a value that is comprised in an interval $I_i=[b_{inf,i}; b_{sup,i}]$ are visited and can be stored in the stack. The search interval $I_i$ for each decoded symbol $s_i$ is such that $b_{inf,i} \leq s_i \leq b_{sup,i}$. The lower boundary $b_{inf,i}$ and the upper boundary $b_{sup,i}$ of the search interval $I_i$ may be defined as follows:

$$b_{inf,i} = \left\lceil -\sqrt{\frac{T_i}{p_{ii}}} + S_i \right\rceil \qquad (16)$$

$$b_{sup,i} = \left\lfloor -\sqrt{\frac{T_i}{p_{ii}}} + S_i \right\rfloor \qquad (17)$$

Where:

$$p_{ii} = R_{ii}^2 \text{ with } i=1, \ldots n \qquad (18)$$

$$p_{ij} = \frac{R_{ij}}{R_{ii}} \qquad (19)$$

with $$j = i+1, \ldots, n$$

$$S_i = \rho_i + \Sigma_{j=i+1}^n p_{ij}\xi_j \qquad (20)$$

$$T_i = C^2 + \Sigma_{l=i+1}^n p_{ll}(\xi_l + \Sigma_{j=l+1}^n p_{lj}\xi_j)^2 = T_{i-1} - p_{ii}(S_i - s_i) \qquad (21)$$

The number of visited nodes during the decoding process depends then on the interval $I_i$ for each symbol $s_i$, the boundaries of the search interval depending on the initial sphere radius C.

An interval is thus determined for each node $s_i$ representing a component of a symbol of the signal to be decoded. The search is continued until finding a leaf node and the optimal path $(s_n, s_{n-1}, \ldots s_1)$ is returned (closest vector to the received signal vector according to the ML criterion), without any update of the radius. A likelihood probability may be further assigned to the bits of at least one symbol of the data signal, taking into account the stored paths and a probabilistic estimation of the data signal (single-carrier and multi-carrier) may be determined taking into account the path(s) stored in the second stack and likelihood probabilities to determine the optimal path.

Figure 5:
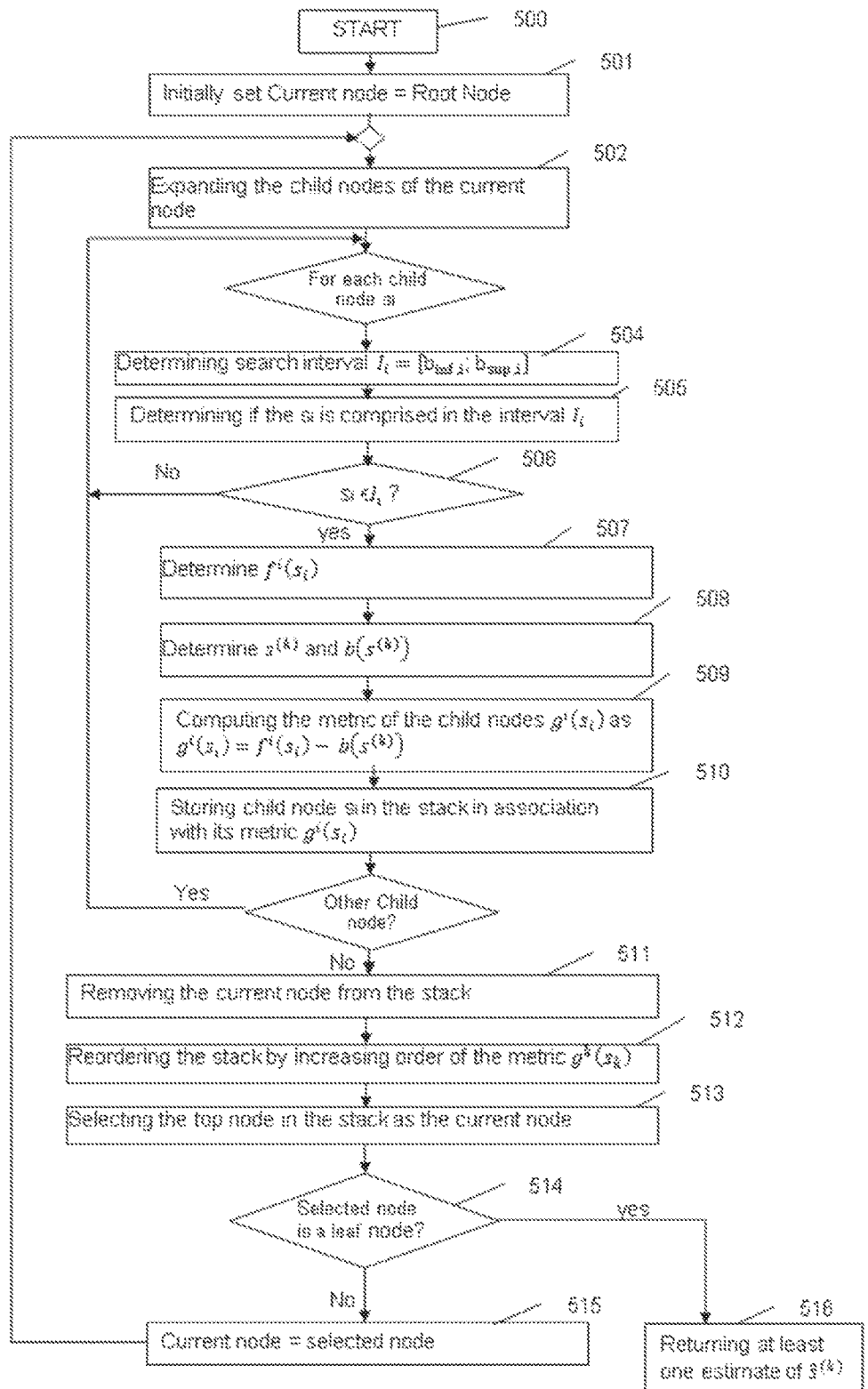
FIG. 5 is a flowchart depicting a sequential sub-block decoding method according to another embodiment.

Referring to FIG. 5, a flowchart depicting the SB stack decoding method according to certain embodiments is shown.

The method may comprise a pre-decoding step including at least some of the following steps:
  performing a preprocessing on the channel matrix using for example a lattice reduction technique to improve the orthogonality of the column vectors of said matrix or/and using an MMSE-GDFE filtering to enhance the conditioning of the channel matrix,
  performing a QR decomposition of the channel matrix such that H=QR where Q designates the orthogonal matrix and R designates an upper triangular matrix,
  calculating the equivalent system to provide a triangular lattice representation of the lattice generated by H or equivalently by R.

This allows making a tree search to find the point in the tree solution of the minimization problem given by equation (22):

$$\min_{s \in A} \|R\xi\|^2 \leq C_{prop}^2 \qquad (22),$$

In equation (22), the parameter $\xi$ is given by $\xi = \rho - s$.

Once a signal to be decoded has been received, the decoder may implement at least one iteration of the following steps 501 to 515, for a current node of the tree stored in the stack.

The method initially starts with the root node as the current node. The first current node is therefore the root node (step 501).

The method initially starts by processing the root node as the current node (step 501). Steps 502 to 515 are iterated for each current node selected from the top of the stack to generate the child nodes for which the current node is the parent node. Each iteration is thus associated with a level i of the decoding tree (i=n to 1). The parameter i may be decremented for each new iteration depending on the top node that is selected in the stack.

The first iteration of the decoding tree method is implemented to determine the child nodes of the root node at a first level i=n.

The subsequent iterations of the decoding tree method may be implemented to determine the child nodes of a current node corresponding to the top node selected in the stack (and to a given level or layer i of the decoding tree).

Each node of the tree may be associated with a metric, a path and/or a dimension (or depth). The dimension of a node corresponds to the level of the node in the tree considering the root node as a reference node.

According to the invention, the metric of a node $G^i(s_i)$ may be determined from a function of the Euclidean distance $f^i(s_i)$ between the signals received and the path between the root node and the node considered and for at least some of the nodes:
  from the function $f^i(s_i)$ of the Euclidean distance between the signals received and the path between the root node and the node considered;
  from the sub-block weighting coefficient b(i).

In the decoding tree, there exists a single path between the root node and a node being considered. From this path, it is thus possible to determine the corresponding decoded bits or an estimation of the transmitted information sequence transmitted between the root node and the node considered.

Specifically, for the current node being processed, all or a preselected subset of child nodes are determined by projecting $\tilde{y}$ on the i-th layer of the matrix R resulting from the QR decomposition, and for each child node (step 502), a constraint defining a condition that is to be satisfied by the child node with respect to the search interval $I_i$.

The search interval $I_i=[b_{inf,i}; b_{sup,i}]$ for the level i of the current node (corresponding to a component of the decoded symbol) is determined in step 504 and comprises a lower bound $b_{inf,i}$ and an upper bound $b_{sup,i}$ determined from the initial radius according to equations (16) and (17). This interval thus limits the search region.

Specifically, in steps 505 and 506, it is determined if the considered child node of the current node has a value comprised within the interval $I_i$. If so, the metric of the node $g^i(s_i)=f^i(s_i)-b(k)$ is computed in steps 507 to 509 as described in relation with steps 403 to 405 of FIG. 3 using the sub-block weighting coefficient b(k) determined for the sub-block $s^{(k)}$ to which the node $s_i$ belongs. The child node is added in the stack, in step 510, together with its associated metric. Additional data may be stored in the stack in association with each child node such as the path and/or the dimension of the child node. A child node may be thus taken into consideration only when its value lies in the search interval $I_i$. Accordingly, all child nodes or a subset of the child nodes having a value comprised in the interval $l_i$ will be stored in the stack. As a result, the paths scanned in the tree correspond to the points of the lattice located inside a sphere having a radius C. The initial radius C may be determined according to different approaches.

The decoding method may be applicable to decode finite or infinite lattices in $\mathbb{C}^n$, the value of each node in the tree corresponding to the component of a symbol belonging to a constellation having a predefined range between a minimum threshold $C_{min}$ and a maximum threshold $C_{max}$. In embodiments where finite lattices are decoded (finite constellations), such as with QAM modulation, information symbols $s_i$ are selected from a finite alphabet and their real and imaginary parts, which correspond to the decoded symbols over the tree, belong to the finite interval $l=[C_{min}, C_{max}]$. For example, in embodiments using a q-QAM modulation, the symbols $s_i$ belong to the interval $l_c=[\pm 1, \pm 2, \pm 3, \ldots, \pm\sqrt{q}-1]$ and the nodes in the search tree corresponding to the used constellation symbols belong to the infinite set $I=[0, 1, 2, 3, \ldots, \sqrt{q}-1]$ where $C_{min}=0$ and $C_{max}=\sqrt{q}-1$.

In such embodiments, in order to guarantee that the estimated symbols belong to the considered constellation, in steps 505 and 506, the child nodes of the $i^{th}$ level may be alternatively selected within an interval $V_i$ corresponding to the intersection between the constellation interval $[C_{min}, C_{max}]$ corresponding to the constellation and the intervals $I_i$:

$$I'_i=[\max(C_{min}, b_{inf,i}),(C_{max}, b_{sup,i})].$$

When all the child nodes of the current node have been processed, in step 511, the current node is deleted from the stack.

In step 512, the stack may be reordered by an increasing order of the metrics $g^k(s_k)$ so that the node $s_q$ in the stack having the lowest metric is stored in the top of the stack.

In step 513, the top node of the stack $s_q$ is selected as the current node in order to generate its child nodes.

In step 514 it is determined if the selected node is a leaf node. If the selected node is a leaf node (i.e. not having no child node), the method is terminated.

Otherwise, in step 515, the selected node is set as the current node and steps 502 to 515 may be repeated for the newly selected node (which represents the node having the lowest metric in the stack) to generate the child nodes, at a next level j of the decoding tree with j being comprised between n−1 to 1. The next processed level j depends on the top node selected in the stack.

Each iteration of steps 502 to 515 (corresponding to the processing of a current node) thus provides a path between the root node and a new leaf node stored in the stack.

When a leaf node is reached in the first iteration, the algorithm may terminate the processing or perform new iterations of steps 502 to 515. The closest vector to the vector representing the received signal may be estimated in step 516 by taking into account the node information stored in the stack, and in particular the path(s) stored in the stack when such information is available. For example, if a binary estimation (hard decision) is applied, the construction of the tree implements a single iteration of steps 502 to 515 enabling a single path to be determined corresponding to a hard estimation of the transmitted data signal. Alternatively, if a probabilistic estimation (soft decision) is applied, the decoding method may deliver soft-output information in the form of Log-Likelihood Ratio (LLR) values. In this case, several iterations of steps 502 to 515 may be performed. Each iteration provides a different path from the root node to leaf nodes (representing candidate lattice point). These different paths (representing candidate lattice points) may then be stored in an auxiliary stack together with their paths.

In an alternative embodiment of the invention, the decoding method may be based on a recursive sub-block decoding algorithm.

Even if the invention has particular advantages for computing the metric of an expanding child node, the metric reduction using the sub-block dependent weighting coefficient b(k) may be alternatively applied only to the nodes stored in the stack for reordering the stack, while computing the metric conventionally in step 403-405 of FIG. 4 or 507-509 of FIG. 5 from the function $f^i(s_i)$ only as disclosed in EP No 15305910 (filed on Jun. 12, 2015).

In still another application, the metric reduction using the sub-block dependent weighting coefficient b(i) may be applied in response to the detection of a triggering alarm to trigger early termination, while also computing the metric conventionally in step 403-405 of FIG. 4 or 507-509 of FIG. 5 from the function $f^i(s_i)$ only from the function $f^i(s_i)$ as disclosed in EP No 15305907 (filed on Jun. 12, 2015).

Figure 6:
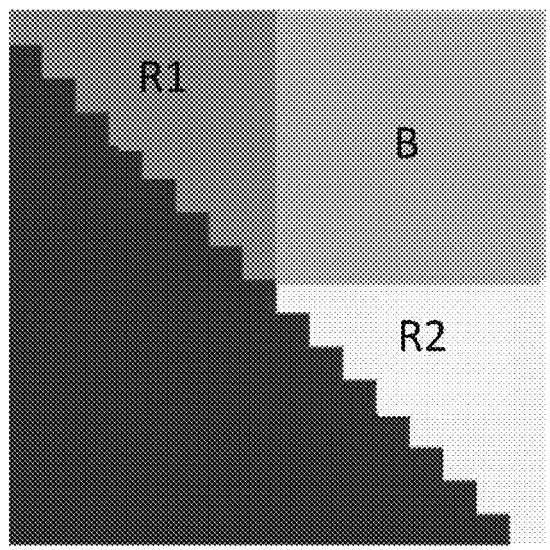
FIG. 6 illustrate an exemplary division of an upper triangular matrix.

FIG. 6 represents an exemplary division of the upper triangular matrix R into two upper triangular matrix $R^{(1)}=R1$ (matrix of dimension 8×8) and $R^{(2)}=R2$ (matrix of dimension 8×8), and a rectangular matrix B.

Figure 7:
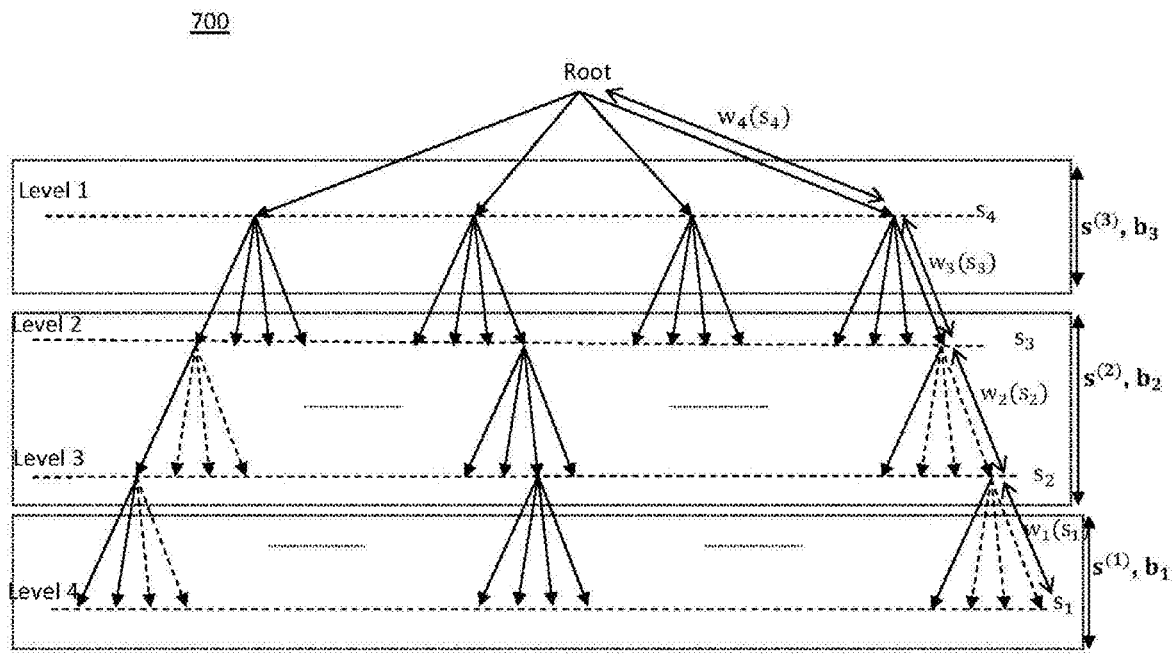
FIG. 7 shows an exemplary tree representation of the ML optimization problem illustrating the division into sub-blocks.

FIG. 7 shows an exemplary tree representation of ML decoding problem for a 16-QAM constellation. In a 16-QAM constellation, the real and imaginary parts of the complex information symbols belong to the set of values {−3, 1, 1, 3}. The decoding method starts a tree-search process from the root node and proceeds along the branches (represented by an arrow) by iteratively expanding child nodes of the top node in the stack. The nodes are represented by the extremities of the arrows used to depict the branches. The decoding tree 700 comprises 4 levels (level 1, level 2, level 3 and level 4) and each level corresponding to the different values taken by the real symbols (level 1 corresponds to $s_4$, level 2 corresponds to $s_3$, level 3 corresponds to $s_2$, and level 4 corresponds to $s_1$).

FIG. 7 shows the sub-block weighting coefficient b(k) associated with each sub-block $s^{(k)}$:
- the sub-block weighting coefficient b(3) associated with each sub-block $s^{(3)}$;
- the sub-block weighting coefficient b(2) associated with each sub-block $s^{(2)}$;
- the sub-block weighting coefficient b(1) associated with each sub-block $s^{(1)}$.

As shown in FIG. 7, the sub-block $s^{(3)}$ comprises one node $s_4$ (i.e. the node $s_4$ belongs to the sub-block $s^{(3)}$), the sub-block $s^{(2)}$ comprises two nodes $s_3$ and $s_2$, and the sub-block $s^{(1)}$ comprises only one node $s_1$.

The metric associated with each path may be either the Euclidean metric or the modified metric computed from the sub-block based weighting coefficients.

In another embodiment of the invention, the weighted sequential decoding method may be implemented according to a sub-block recursive approach using one sequential decoding algorithm $D_k$ for the decoding of each sub-block.

Figure 8:
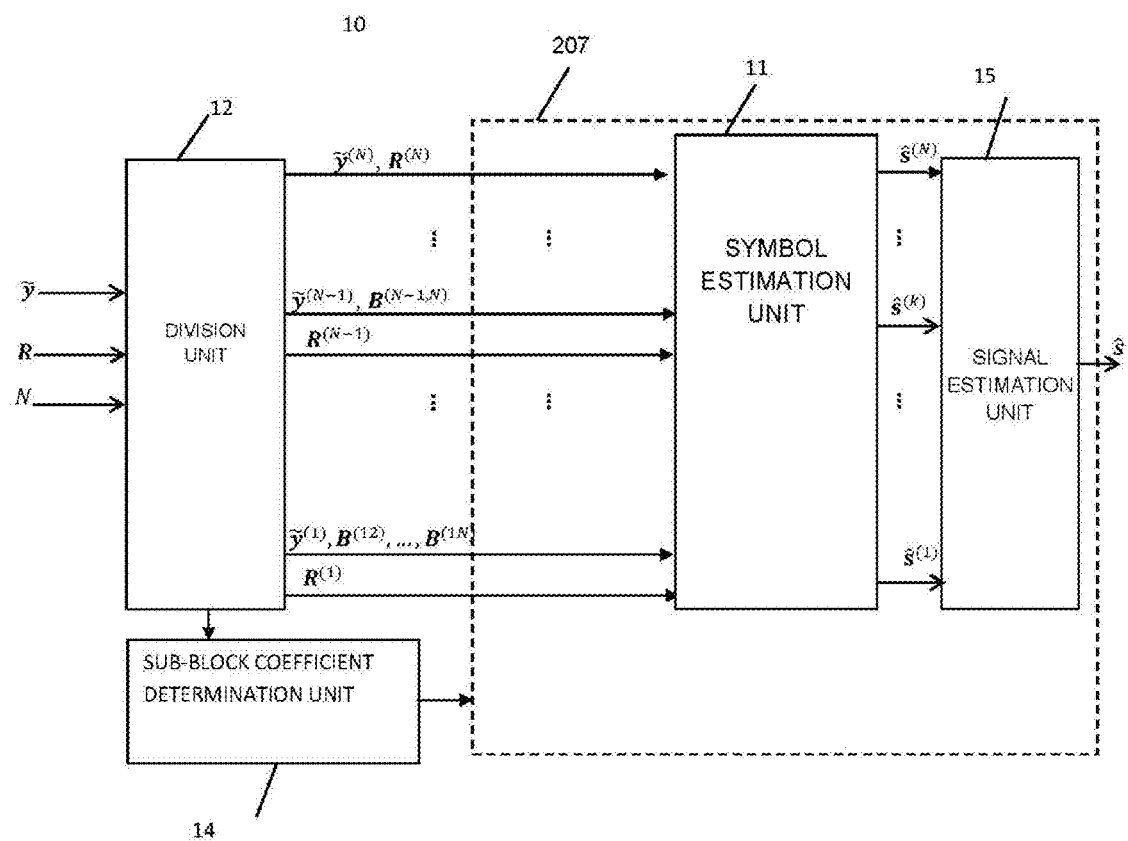
FIG. 8 is a block-diagram representing a decoder according to sub-block recursive approach.

FIG. 8 is a block diagram of a recursive sub-block decoder 10 according to certain embodiments. The decoding unit 207 implements a recursive sub-block decoding using at least one sequential decoding algorithm $D_k$ to determine at least one estimate $\hat{s}^{(k)}$ of each sub-block of the transmitted signal and using a decoding algorithm $D_k$. The decoding unit 207 will be referred to hereinafter as a sub-block decoding unit 207.

In such embodiment, the division unit 12 further divides the vector $\tilde{y}$ into N sub-vectors $\tilde{y}^{(k)}$, k=1, ..., N of lengths $l_k$ in correspondence with the division of the R matrix such that $$\tilde{y} = \begin{bmatrix} \tilde{y}^{(1)} \\ \vdots \\ \tilde{y}^{(N)} \end{bmatrix}$$

and $\sum_{k=1}^{n} l_k = n$.

Equation (8) can thus be rewritten as:

$$\begin{bmatrix} \tilde{y}^{(1)} \\ \vdots \\ \vdots \\ \tilde{y}^{(N)} \end{bmatrix} = \begin{bmatrix} R^{(1)} & \cdots & B^{(1,N-1)} & B^{(1N)} \\ 0 & \cdots & \vdots & \vdots \\ 0 & 0 & R^{(N-1)} & B^{(N-1,N)} \\ 0 & 0 & 0 & R^{(N)} \end{bmatrix} \cdot \begin{bmatrix} s^{(1)} \\ \vdots \\ \vdots \\ s^{(N)} \end{bmatrix} + \begin{bmatrix} \tilde{w}^{(1)} \\ \vdots \\ \vdots \\ \tilde{w}^{(N)} \end{bmatrix} \quad (23)$$

The ML decoding problem of equation (9) can thus be rewritten as:

$$\hat{s} = \mathrm{argmin}_{s \in \mathcal{A}^n} \|\tilde{y} - Rs\|^2 = \mathrm{argmin}_{s^{(k)} \in \mathcal{A}^{l_k}} \| \sum_{k=1}^{N} \tilde{y}^{(k)} - (R^{(k)} s^{(k)} + \sum_{j=k+1}^{N} B^{(kj)} s^{(j)}) \|^2 \quad (24)$$

The sub-block decoding unit 207 may further comprise N symbol estimation units 11 for determining at least one estimate $\hat{s}^{(k)}$ for each sub-block $s^{(k)}$ using a sequential decoding algorithm Dk and the estimates $\hat{s}^{(N)}, \ldots \hat{s}^{(k-1)}$ determined for the previously estimated sub-blocks $s^{(N)}, \ldots s^{(k-1)}$. It should be noted that alternatively only one symbol estimation unit or a set of M symbol estimation units (M<N) may be used to recursively decode each sub-block $s^{(k)}$.

The sub-block decoder 207 may further comprise a signal estimation unit 15 configured to determine the real-value vector $\hat{s}_p[\hat{s}^{(1)}, \hat{s}^{(2)}, \ldots \hat{s}^{(N)}]^t$ by aggregating the outputs of the N symbol estimation units.

Each symbol estimation unit 11 applies at least one iteration of a sequential decoding algorithm $D_k$ to determine estimated symbols representative of the transmitted symbols $\hat{s}^{(k)}$ comprised in a sub-vector $\tilde{y}^{(k)}$ from information stored in a stack. The symbol estimation unit 11 may determine a sub-block metric for at least one of the expanded child node from the initial metric associated with the child node and the sub-block weighting coefficient b(k) determined for the sub-block $s^{(k)}$ being processed. In one embodiment, the metric of a node may be determined by reducing the initial metric of the node by the sub-block weighting coefficient. The following description will be made with reference to a reduction of the initial metric using the sub-block weighting coefficient, for illustration only.

Figure 9:
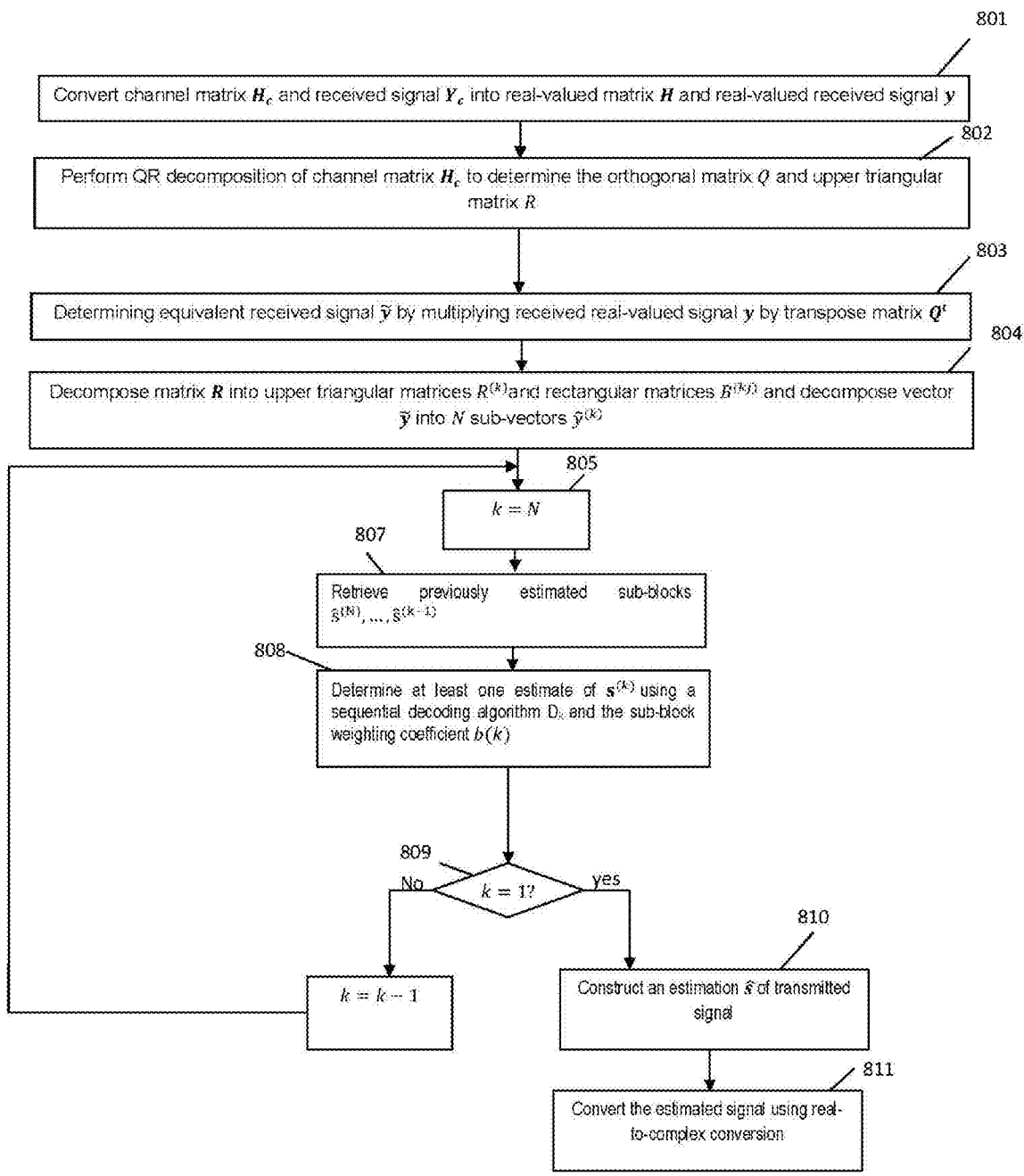
FIG. 9 is a flowchart depicting a sub-block recursive decoding method according to certain embodiments.

FIG. 9 is a flowchart depicting the decoding method according to a recursive sub-block decoding approach.

In step 901, a complex-to-real conversion may be performed to determine a real-value system of the received signal. For example in one embodiment using a spatial multiplexing scheme, the system in equation (2) may be transformed into:

$$y = \begin{bmatrix} \mathrm{Re}(y_c) \\ \mathrm{Im}(y_c) \end{bmatrix} = \begin{bmatrix} \mathrm{Re}(H_c) & -\mathrm{Im}(H_c) \\ \mathrm{Im}(H_c) & \mathrm{Re}(H_c) \end{bmatrix} \begin{bmatrix} \mathrm{Re}(s_c) \\ \mathrm{Im}(s_c) \end{bmatrix} + \begin{bmatrix} \mathrm{Re}(w_c) \\ \mathrm{Im}(w_c) \end{bmatrix} \quad (24)$$

The Re(.) and Im(.) operators in equation (4) output the real and imaginary parts of each element composing the underlying vector or matrix.

Equation (24) can be written in a lattice representation form as:

$$y = Hs + w \quad (25)$$

Both spatial multiplexing and Space-Time Block coded symmetric and asymmetric MIMO schemes may be used for real-value lattice representations of the channel output given in equation (25). To facilitate the understanding of the following embodiments, the following description will be made with reference to a spatial multiplexing scheme and involving a symmetric MIMO configuration where the transmitter and receiver are equipped with the same number of antennas $n_t = n_r$. Accordingly, the real-value vectors y, s and w in equation (25) will be represented as n-dimensional vectors with $n = 2n_t = 2n_r$ and the equivalent real-value channel matrix H will be a square n×n matrix. The vector s is composed of the real and imaginary parts of the original complex information symbols composing the vector $s_c$.

In step 902, a QR decomposition of the channel matrix (permuted channel matrix in certain embodiments) may be performed such that H=QR. Q designates an n×n orthogonal matrix and R is an n×n upper triangular matrix. Given the orthogonality of matrix Q, a multiplication of the system in equation (25) may be performed in step 903 to determine the equivalent received signal $\tilde{y}$ and the equivalent system according to:

$$\tilde{y} = Q^t y_p = Rs + w \quad (26)$$

The real-value equivalent system in equation (25) is considered for the estimation of the originally transmitted information symbols.

Prior to step 902, a permutation of the row vectors or column vectors of the channel matrix H may be performed using a permutation matrix to reorder the channel matrix Optimal decoding performance is obtained using optimal ML decoding according to the ML decoding problem given by:

$$\hat{s}_{ML} = \mathrm{argmin}_{s \in \mathcal{A}^n} \|\tilde{y} - Rs\|^2 \quad (27)$$

In equation (27), $A = [c_{min}, c_{max}]$ designates the alphabet to which belong the real and imaginary parts of the complex-value vector $s_c$ composing the real vector s.

An ML metric may be defined as:

$$m(s) = \|\tilde{y} - Rs\|^2 \quad (28)$$

In step 904, a set of sub-block decoding parameters may be determined such as a number of sub-blocks N (preferably greater than or equal to 2), a set of sub-block lengths $l_{k,k=1,\ldots,N}$ satisfying $\Sigma_{k=1}^{N} l_k = N$, and a set of sequential decoding algorithms Dk (k=1, . . . N). The lengths $l_{k,k=1,\ldots,N}$ may be equal or different. The decoding algorithms may be similar or distinct.

A division of the upper triangular matrix R into sub-matrices and a division of the vector $\tilde{y}$ into sub-vectors may be then performed. Accordingly, the vector $\tilde{y}$ is divided into N sub-vectors $\tilde{y}^{(k)}$, k=1, . . . N of lengths $l_k$ such that $$\tilde{y} = \begin{bmatrix} \tilde{y}^{(1)} \\ \vdots \\ \tilde{y}^{(N)} \end{bmatrix}.$$

The same vector division may be applied to the vector of symbols s and to the noise vector w to determine the sub-vectors $s^{(k)}$ and $w^{(k)}$ each of corresponding lengths $$l_k \text{ such that} = s = \begin{bmatrix} s^{(1)} \\ \vdots \\ s^{(N)} \end{bmatrix} \text{ and } w = \begin{bmatrix} w^{(1)} \\ \vdots \\ w^{(N)} \end{bmatrix}.$$

The upper triangular matrix may be divided into $$N + \frac{N(N+1)}{2}$$

matrices composed of N upper triangular matrices $R^{(k)}$, k=1, . . . , N and $$\frac{N(N+1)}{2}$$

rectangular matrices $B^{(jk)}$, k=1, . . . , N; j=k, . . . , N as described above.

The divided sub-matrices, divided sub-vectors and sub-block decoding parameters may be stored in a sub-block set $(SB)_k$, k=1, . . . , N, comprising data related to each sub-block $s^{(k)}$. A set $(SB)_k$, for k ranging from 1 to N−1, may be defined as $(SB)_k = \{l_k, s^{(k)}, R^{(k)}, \tilde{y}^{(k)}, \tilde{w}^{(k)}, D^{(k)}, B^{(kj)}, j=k+1, \ldots, N\}$ where $$\tilde{y}^{(k)} = R^{(k)}s^{(k)} + \Sigma_{j=k+1}^{N} B^{(kj)}s^{(j)} + \tilde{w}^{(k)} \quad (29)$$

For k=N, the set $(SB)_N$ is given by $(SB)_N = \{l_N, s^{(N)}, R^{(N)}, \tilde{y}^{(N)}, \tilde{w}^{(N)}, D^{(N)}\}$ such that:

$$\tilde{y}^{(N)} = R^{(N)}s^{(N)} + \tilde{w}^{(N)} \quad (30)$$

Systems in equations (29) and (30) may be used for the decoding of the various sub-vectors of information symbols.

The ML decoding metric in equation (24) may be written as:

$$m(s) = \|\tilde{y} - Rs\|^2 = \|\Sigma_{k=1}^{N} \tilde{y}^{(k)} - R^{(k)}s^{(k)} + \Sigma_{j=k+1}^{N} B^{(kj)}s^{(j)})\|^2 \quad (31)$$

Each sub-vector of symbols $s^{(k)}$, k=N, N−1, . . . , 1 may be estimated recursively in step 908 by applying at least one iteration of the sequential algorithm Dk using the previously estimated sub-blocks $\hat{s}^{(k)}$ of the sub-vector of symbols $s^{(k)}$ for k∈[N, k−1] and the sub-block weighting coefficient b(k). The sub-block weighting coefficient b(k) may be predetermined (the sub-block weighting coefficient b(k) belonging to the set $(SB)_k = \{l_k, s^{(k)}, R^{(k)}, \tilde{y}^{(k)}, \tilde{w}^{(k)}, D^{(k)}, B^{(kj)}, j=k+1, \ldots, N, b(k)\}$) or determined dynamically. An initialization is performed in step 905 corresponding to k=N and the previously estimated sub-blocks $\hat{s}^{(k)}$ of the sub-vector of symbols $s^{(k)}$ for k∈[N, k−1] may be retrieved in step 907.

Step 908 may be repeated for each sub-block to determine a sub-vector estimation $\hat{s}^{(k)}$ of the sub-vector of symbols $s^{(k)}$.

More specifically, for each index k=N−1, . . . , 1, a sub-vector $\bar{y}^{(k)} = \tilde{y}^{(k)} - \Sigma_{j=k+1}^{N} B^{(kj)}\hat{s}^{(j)}$ may be computed in step 908 from the previously estimated sub-vectors $\hat{s}^{(j)}$, j=k+1, . . . , N and the rectangular sub-matrices $B^{(kj)}$, j=k+1, . . . , N. An estimate of the sub-vector of index k may be determined using the sequential decoding algorithm $D^{(k)}$, the upper triangular sub-matrix $R^{(k)}$ and the calculated sub-vector $\bar{y}^{(k)}$. For k=N, the estimate $\hat{s}^{(N)}$ may be determined using the corresponding decoding algorithm $D^{(N)}$, the corresponding upper triangular sub-matrix $R^{(N)}$ and the vector $\bar{y}^{(N)} = \tilde{y}^{(N)}$.

If it is determined that all the sub-vectors of symbols have been estimated in step 909, step 910 and 911 may be performed to construct an output, from the sub-vectors $\hat{s}^{(k)}$, k=1, . . . , N, as an estimation $\hat{s}_c$ of the transmitted signal. The construction step may comprise two phases. First, an estimate of the real vector $\hat{s} = [\hat{s}^{(1)}, \ldots, \hat{s}^{(N)}]^t$ may be constructed by aggregating the different estimates in the different sub-vectors. Then, the obtained vector may be converted into the complex vector $\hat{s}_c = [\hat{s}_1, \hat{s}_2, \ldots, \hat{s}_{n/2}]^t$ such that a component $\hat{s}_j$ for j=1, . . . , n/2 is given by:

$$\hat{s}_j = (\hat{s})_j + i(\hat{s})_{j+n/2} \quad (32)$$

In equation (32), $(u)_j$ denotes the $j^{th}$ element of the vector u.

According to certain embodiments of the invention, the sequential decoding algorithms Dk, implemented in the symbol estimation units 11 for k=1, . . . , N may be similar or different. A decoding algorithm Dk may be, without limitations, any sequential decoding algorithm, such as a stack or SB-stack decoding algorithm. Further, a preprocessing on the corresponding sub-upper triangular matrix $R^{(k)}$ prior to decoding using a lattice reduction such as LLL reduction and/or a left preprocessing using for example an MMSE-GDFE filtering may be performed. Preprocessing methods may be applied on the channel matrix prior to sub-block division and detection according to certain embodiments of the invention.

Each sequential decoding algorithm Dk used for a given sub-block $s^{(k)}$ may attempt to deliver an estimate $\hat{s}^{(k)}$ by minimizing the sub-block metric $m(s^{(k)}) = \|\bar{y}^{(k)} - R^{(k)}s^{(k)}\|^2$ according to:

$$\hat{s}^{(k)} = \operatorname{argmin}_{s^{(k)} \in A^{l_k}} m(s^{(k)}) = \operatorname{argmin}_{s^{(k)} \in A^{l_k}} \|\bar{y}^{(k)} - R^{(k)}s^{(k)}\|^2 \quad (33)$$

Sequential tree-search algorithms such as the Sphere Decoder (SD), the Stack decoder or and the SB-Stack decoder (SB-Stack), may be used to solve equation (33).

It should be noted that in an application of the invention to a linear Space-Time Block code of length T and encoding κ symbols, the real-value expression of the channel output can be written in the lattice representation form of equation (25) while the equivalent channel matrix in this case is the real-value $2n_rT \times 2\kappa$ matrix $H_{eq}$ given by:

$$H_{eq} = (I_T \otimes H)G \quad (36)$$

The $2n_rT \times 2\kappa$ matrix G is a real-valued matrix known as a generator matrix or coding matrix of the linear Space-Time Block code. $I_T$ denotes the identity matrix of dimension T and the operator $\otimes$ is the Kronecker matrices product.

Further, in one application of the invention to asymmetric MIMO configurations with $n_t<n_r$, a lattice representation in the form of equation (25) can also be obtained by performing the complex-to-real conversion of step 901 to the equivalent system to equation (5) given by:

$$U^\dagger y_c = DV^\dagger s_c + U^\dagger w_c \qquad (37)$$

The matrices U and V are unitary obtained, together with matrix D, from the singular value decomposition of the matrix $H_c = UDV^t$. D is diagonal having positive diagonal entries representing the singular values of the matrix $H_c$.

Figure 10:
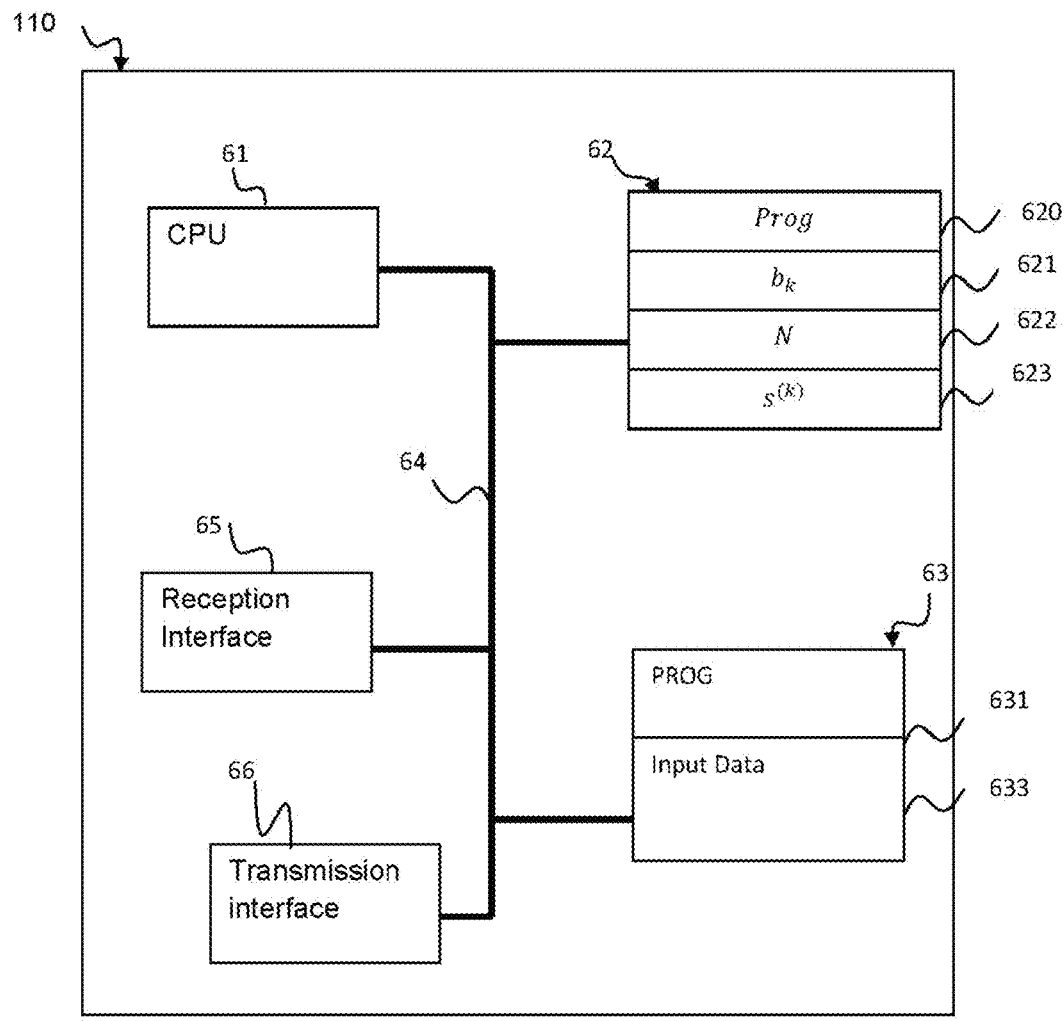
FIG. 10 schematically shows an exemplary hardware architecture of the decoder according to certain embodiments.

FIG. 10 represents an exemplary architecture of a space/time decoder 30 of the receiver 3 in a SB-stack embodiment of the invention. As shown, the space/time decoder 30 may include the following elements, which are linked together by a data and address bus 64:
- a microprocessor 61 (or CPU), which is, for example, a digital signal processor (DSP);
- a non-volatile memory 62 (or ROM, read-only memory);
- a random access memory RAM 63;
- an interface 65 for receiving input signals coming from the time/frequency converter;
- an interface 66 for transmitting decoded data to the demodulator 31.

The non-volatile ROM memory 62 may include for example:
- a register "Prog" 620;
- coefficients 621 of the sub-block weighting coefficients b (k);

The non-volatile ROM memory 62 may comprise other predefined parameters used by the decoder such as $C_{min}$ and $C_{max}$ in embodiments where finite lattices are decoded (not represented).

The algorithms for implementing the method according to this embodiment of the invention can be stored in the program 620. The CPU processor 41 may be configured to download the program 620 to the RAM memory and runs the corresponding instructions. Specifically, the CPU comprises instructions that, when executed by a processor, cause the CPU to determine the estimated symbols representative of the transmitted symbols from information stored in the stack, the stack being filled by iteratively expanding child nodes of a selected node of a decoding tree, the decoding tree comprising a plurality of nodes, each node of the decoding tree corresponding to a candidate component of a symbol of the received data signal and each node being assigned a metric, the stack being filled at each iteration with a set of expanded child nodes and being ordered by increasing values of the metrics associated with the nodes. The selected node, for each iteration, corresponds to the node having the lowest metric in the stack. The CPU is caused to determine an initial metric for each child node of the set of expanded child nodes. The CPU is further caused to calculate the modified metric for at least one of the expanded child node from the initial metric associated with the expanded child node and the weighting coefficients (function of the level of the node in the decoding tree). The CPU is further caused to assign the modified metric to the at least one of the expanded child node.

The RAM memory 63 may include:
- in a register Prog 630, the program run by the microprocessor 61 and downloaded in an active mode of the space/time decoder 30;
- input data in a register 631;
- data related to the nodes in a register 632;
- likelihood probabilities or LLR in a register 634;

The data stored in the register 632 may include, for a node of the decoding tree, the metric parameters associated with this node (path from the root to said node, and/or the depth in the tree) as determined according to the various embodiments of the invention.

More generally, the decoding techniques described herein may be implemented by various means. For example, these techniques may be implemented in hardware, software, or a combination thereof. For a hardware implementation, the processing elements of decoder can be implemented for example according to a hardware-only configuration (for example, in one or more FPGA, ASIC or VLSI integrated circuits with the corresponding memory) or according to a configuration using both VLSI and DSP.

While the invention has been described in relation with a wireless communication system, it should be noted that the invention is not limited to such applications. For example, the decoding device and method may be integrated in a signal processing apparatus, for example electronic filters of finite impulse response (FIR) used in audio applications such as audio crossovers and audio mastering, to decode an output sequence from a given input sequence. Given an input sequence of data, the output sequence of a FIR filter of order M is a weighted sum of the recent input values observed in a sliding window of size M. Given the lattice representation in the model of the output sequence, certain embodiments of the invention may be accordingly integrated to generate an estimate of the input sequence.

While embodiments of the invention have been illustrated by a description of various examples, and while these embodiments have been described in considerable detail, it is not the intent of the applicant to restrict or in any way limit the scope of the appended claims to such detail. Particularly, the invention is not limited to a particular type of sequential decoding algorithm. More generally the invention may apply to any sequential decoding algorithm using a best-first tree-search to search for candidate lattice vectors such as Stack decoders, Fano decoders, decoders implementing the M-algorithm, the SB-Stack and the Zigzag Stack decoder as described in patent application EP No 14306517.5. The zigzag decoder uses a stack, similarly to the SB-stack decoding algorithm, but instead of generating all child nodes or searching the candidate lattice points in a search interval, the zigzag decoding algorithm generates, in step 302 of the flowchart of FIG. 3, at most three child nodes comprising a reference child node of the current node determined from the vector representing the received data signal, a first neighbor child node determined by subtracting a positive integer parameter from the value of the reference node, and a second neighbor child node determined by adding the positive integer parameter to the value of the reference child node. Child nodes are then selected in step 304 of the flowchart of FIG. 3 among the three child nodes. The selected child node can then be stored in a stack similarly to the SB-stack decoder together with their respective metric, the stack being then reordered by increasing order of the node metrics. The top node of the stack, thus obtained, is selected as the new current node to iterate the recursive search operation.

Further, although the invention has been described in relation with certain examples of the sub-block weighting coefficient, and particularly with certain examples of such weighting coefficient for illustrative purpose only, it should be understood that the invention is not limited to such examples.

Further, the various embodiments of the invention are not limited to particular types of detection, and apply both to hard and soft decoding.

The invention claimed is:

1. A decoder for decoding a signal received through a transmission channel in a communication system, said signal carrying information symbols selected from a given set of values and being associated with a signal vector, said transmission channel being represented by a channel matrix, wherein said decoder comprises:
   a sub-block division unit configured to divide the received signal vector into a set of sub-vectors in correspondence with a division of a matrix related to said channel matrix;
   at least one weighting coefficient calculation unit configured to calculate a sub-block weighting coefficient for each sub-vector,
   at least one symbol estimation unit for recursively determining estimated symbols representative of the transmitted symbols carried by the data signal from information stored in a stack,
   wherein said at least one symbol estimation unit is configured to apply at least one iteration of a sequential decoding algorithm, said sequential decoding algorithm comprising iteratively filling a stack by expanding child nodes of a selected node of a decoding tree comprising a plurality of nodes, each node of the decoding tree corresponding to a candidate component of a symbol of at least a part of the received signal and each node being assigned a metric, wherein the at least one symbol estimation unit further comprises a metric modification unit configured to calculate a modified metric for one or more nodes of said expanded child nodes, a modified metric being calculated for a node of said one or more expanded child nodes using the metric associated with said node and the sub-block weighting coefficient calculated for the sub-vector to which said node belongs, the at least one symbol estimation unit being configured to replace the metric assigned to said node with the modified metric calculated for said node.

2. The decoder of claim 1, wherein the decoder is configured to previously determine an orthogonal matrix Q and an upper triangular matrix R by performing a QR decomposition from said channel matrix, and said sub-block division unit is configured to divide said upper triangular matrix R into a number of upper triangular sub-matrices and a number of rectangular sub-matrices, said number of upper triangular sub-matrices being greater than or equal to two, said sub-block division unit being configured to divide the received signal vector into a set of sub-vectors such that each sub-vector of the received signal vector corresponds to one of the upper triangular sub-matrices.

3. The decoder of claim 1, wherein said at least one symbol estimation unit is configured to recursively determine at least one estimate of each sub-block of the transmitted signal corresponding to each sub-vector, each estimate of a given sub-block being determined from at least one estimate of the previously processed sub-blocks, said symbol estimation unit being configured to apply at least one iteration of a sequential decoding algorithm to determine at least one estimate of each sub-block of the transmitted signal using said at least one estimate of the previously processed sub-blocks.

4. The decoder of claim 1, wherein said sub-block weighting coefficient calculated for a given sub-block is the same for each sub-block.

5. The decoder of claim 1, wherein said sub-block weighting coefficient calculated for a given sub-block is a function of at least some of the sub-block weighting coefficients determined for the previously estimated sub-blocks.

6. The decoder of claim 1, wherein said sub-block weighting coefficient calculated for a given sub-block is a function of the signal-to-noise ratio.

7. The decoder of claim 1, wherein said sub-block weighting coefficient is a function of a sub-block parameter chosen in the group consisting of the level of the part of the decoding tree corresponding to the sub-block, and the size of the sub-block.

8. The decoder of claim 1, wherein said sub-block weighting coefficient is a function of a division parameter chosen in the group consisting of the number of sub-blocks, and the order of the sub-blocks.

9. The decoder of claim 1, wherein said metric modification unit is configured to calculate a modified metric for a node by subtracting the sub-block weighting coefficient calculated for the sub-vector to which said node belongs from the metric assigned to said node.

10. The decoder of claim 1, wherein said metric modification unit is configured to calculate a modified metric for each expanded child node.

11. The decoder of claim 1, wherein said metric modification unit is configured to calculate a modified metric for each node of said selected set of expanded child nodes.

12. The decoder of claim 1, wherein said metric modification unit is configured to calculate a modified metric for each node stored in the stack, in response to the detection of a stack reordering condition, said decoder being further configured to reorder the stack by increasing values of the modified metrics associated with the nodes of the stack.

13. The decoder of claim 1, wherein said modified metric calculation unit is configured to calculate a modified metric for each expanded child node in response to the triggering of a termination alarm.

14. The decoder of claim 1, wherein said sequential decoding algorithm is chosen in a group consisting of a stack decoding algorithm, a Fano decoder, a decoder implementing the M-algorithm and a SB-stack decoding algorithm.

15. A receiver for receiving and decoding an encoded signal, wherein the receiver comprises a decoder according to claim 1 for decoding said signal.

16. A mobile device capable of transmitting and receiving data in a wireless communication network, wherein the mobile device comprises a receiver according to claim 15 for receiving a signal.

17. The decoder of claim 2, wherein said decoder is configured to determine said received signal vector by multiplying the transpose matrix of the orthogonal matrix with said received signal.

18. The decoder of claim 2, wherein said sub-block weighting coefficient is a function of the diagonal components of the upper triangular sub-matrix corresponding to said sub-block.

19. A method of decoding a signal received through a transmission channel in a communication system, said signal carrying information symbols selected from a given set of values and being associated with a signal vector, said transmission channel being represented by a channel matrix, wherein said method comprises:
   dividing the received signal vector into a set of sub-vectors in correspondence with a division of a matrix related to said channel matrix;

calculating a sub-block weighting coefficient for each sub-vector, recursively determining estimated symbols representative of the transmitted symbols carried by the data signal from information stored in a stack, wherein said step of recursively determining estimated symbols comprises applying at least one iteration of a sequential decoding algorithm, said sequential decoding algorithm comprising iteratively filling a stack by expanding child nodes of a selected node of a decoding tree comprising a plurality of nodes, each node of the decoding tree corresponding to a candidate component of a symbol of at least a part of the received signal and each node being assigned a metric, wherein the step of recursively determining estimated symbols further comprises calculating a modified metric for one or more nodes of said expanded child nodes, a modified metric being calculated for a node of said one or more expanded child nodes using the metric associated with said node and the sub-block weighting coefficient calculated for the sub-vector to which said node belongs, the method comprising replacing the metric assigned to said node with said modified metric calculated for said node.

20. A computer program product for decoding a signal received through a transmission channel in a communication system, said signal carrying information symbols selected from a given set of values and being associated with a signal vector, said transmission channel being represented by a channel matrix, the computer program product comprising:

a non-transitory computer readable storage medium; and instructions stored on the non-transitory computer readable storage medium that, when executed by a processor, cause the processor to:

divide the received signal vector into a set of sub-vectors in correspondence with a division of a matrix related to said channel matrix;

calculate a sub-block weighting coefficient for each sub-vector, recursively determine estimated symbols representative of the transmitted symbols carried by the data signal from information stored in a stack, wherein the processor is caused to recursively determine estimated symbols by applying at least one iteration of a sequential decoding algorithm, said sequential decoding algorithm comprising iteratively filling a stack by expanding child nodes of a selected node of a decoding tree comprising a plurality of nodes, each node of the decoding tree corresponding to a candidate component of a symbol of at least a part of the received signal and each node being assigned a metric, the processor being further caused to calculate a modified metric for one or more nodes of said expanded child nodes, a modified metric being calculated for a node of said one or more expanded child nodes using the metric associated with said node and the sub-block weighting coefficient calculated for the sub-vector to which said node belongs, the processor being further caused to replace the metric assigned to said node with the modified metric calculated for said node.

* * * * *